(12) United States Patent
Sargent

(10) Patent No.: US 11,028,609 B2
(45) Date of Patent: Jun. 8, 2021

(54) POOL CLEANING SYSTEM, POOL CLEANING DEVICE, AND POOL CLEANING TRANSPORTATION CART

(71) Applicant: Service Industry Solutions, LLC, Riviera Beach, FL (US)

(72) Inventor: David D Sargent, Riviera Beach, FL (US)

(73) Assignee: Service Industry Solutions, LLC, Riviera Beach, FL (US)

( * ) Notice: Subject to any disclaimer, the term of this patent is extended or adjusted under 35 U.S.C. 154(b) by 103 days.

(21) Appl. No.: 15/827,340

(22) Filed: Nov. 30, 2017

(65) Prior Publication Data

US 2018/0148946 A1    May 31, 2018

Related U.S. Application Data

(60) Provisional application No. 62/428,240, filed on Nov. 30, 2016.

(51) Int. Cl.
*E04H 4/16* (2006.01)
*B65H 75/40* (2006.01)
*E04H 4/12* (2006.01)
*B65H 75/44* (2006.01)

(52) U.S. Cl.
CPC ......... *E04H 4/1636* (2013.01); *B65H 75/403* (2013.01); *B65H 75/4468* (2013.01); *E04H 4/1218* (2013.01); *B65H 2701/33* (2013.01)

(58) Field of Classification Search
CPC ........ E04H 4/16; E04H 4/1654; E04H 4/1636
See application file for complete search history.

(56) References Cited

U.S. PATENT DOCUMENTS

| | | | | |
|---|---|---|---|---|
| 4,880,531 | A | * 11/1989 | Blake | B01D 29/27 210/167.17 |
| 7,762,408 | B2 | 7/2010 | Sargent | |
| 8,245,859 | B2 | 8/2012 | Sargent | |
| 8,296,891 | B1 | * 10/2012 | Rowam | E04H 4/1636 15/1.7 |
| 9,045,918 | B2 | 6/2015 | Sargent | |
| 2011/0203980 | A1 | * 8/2011 | Dietrich | E04H 4/1636 210/167.17 |
| 2012/0216837 | A1 | * 8/2012 | Kovarik | E04H 4/1636 134/21 |

* cited by examiner

*Primary Examiner* — Michael D Jennings
(74) *Attorney, Agent, or Firm* — McHale & Slavin, P.A.

(57) ABSTRACT

A pool cleaning system for use in cleaning pools. The pool cleaning system contains a pool cleaning cart, a pool vacuum head, and a vehicle mounting bracket. The pool cleaning cart is designed to easily move various pool cleaning equipment from site to site. The pool vacuum head is configured to be attachable to a pole and be used to clean one or more surfaces of the pool located under the surface of the water. The mounting bracket is configured to allow the pool cleaning cart to secure to a vehicle.

17 Claims, 43 Drawing Sheets

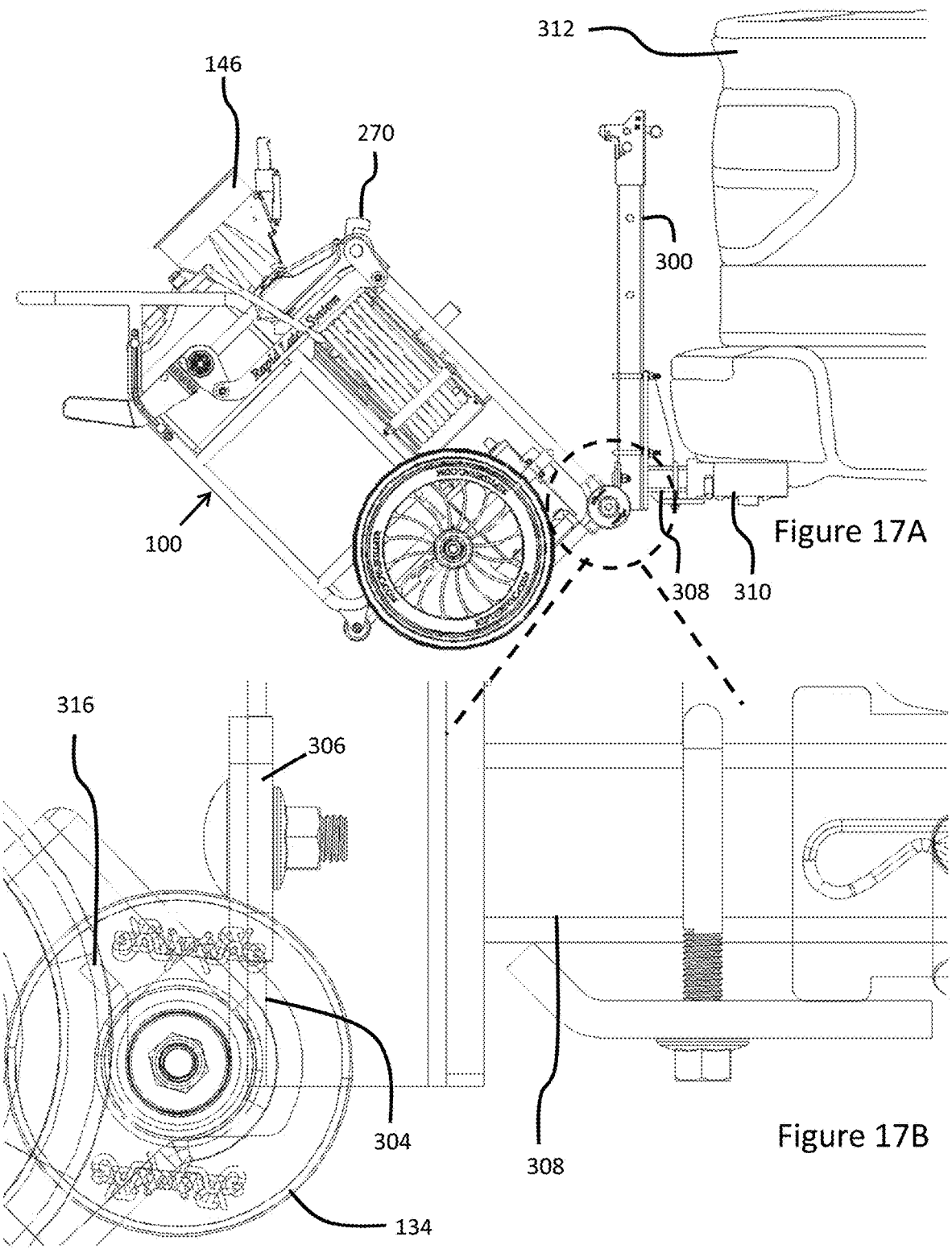

POOL CLEANING SYSTEM, POOL CLEANING DEVICE, AND POOL CLEANING TRANSPORTATION CART

CROSS REFERENCE

In accordance with 37 C.F.R. 1.76, a claim of priority is included in an Application Data Sheet filed concurrently herewith. Accordingly, the present invention claims priority to U.S. Provisional Application No. 62/428,240, entitled, "POOL CLEANING SYSTEM, POOL CLEANING DEVICE, AND POOL CLEANING TRANSPORTATION CART", filed Nov. 30, 2016. The contents of the above referenced application are incorporated herein by reference in their entirety.

FIELD OF THE INVENTION

The present invention relates to pool cleaning and, more particularly, to a system having one or more components for use in cleaning pools; the invention also relates to a pool cleaning device and to a pool cleaning transportation cart and transportation rack.

BACKGROUND OF THE INVENTION

In some areas of the United States, pools are as common as backyard fences. While pools are generally a positive addition to any home or business, pool maintenance can be extensive. Pool maintenance often requires keeping the aquatic environment chemically stable and keeping the pool structure, i.e. walls and bottom surface, free from debris. While pool owners may choose to self-clean, given the need for regular maintenance and upkeep and the labor involved, many pool owners prefer to hire a pool cleaning company.

In addition to chemical treatments, typical pool cleaning equipment includes a pool cleaning net to skim debris from the surface and a pool cleaning vacuum designed to clean the surfaces under the water. Manual pool cleaning vacuum systems require an individual to move a vacuum head along the bottom surface floor in order to remove debris. Usually, a telescopic pole is attached to the pool cleaning head, which allows the user to maneuver the vacuum head under the water surface. While attaching a pole to the vacuum head is a standard practice in the pool cleaning industry, improved mechanisms to allow vacuum head-pole connection which is fast, secure, and minimizes the wear and tear on the vacuum head-pole connection sites is needed. In addition, transporting such materials from location to location can be difficult. Typically, a standard cart configured to hold the various items, such as the hose or vacuum head, is used to help transport the required equipment from site to site. Such carts are poorly constructed and do not offer features that help the user assemble and/or transport the equipment. Accordingly, an improved pool cleaning transportation cart is needed.

SUMMARY OF THE INVENTION

The present invention describes a system having one or more components for use in cleaning pools, a pool cleaning vacuum head device, and a pool cleaning transportation cart.

Accordingly, it is an objective of the invention to provide a system having one or more components for use in cleaning pools.

It is a further objective of the invention to provide an improved pool cleaning vacuum head device.

It is yet another objective of the invention to provide an improved pool cleaning transportation cart.

It is a further objective of the invention to provide a pool cart that uses an improved mechanism to secure a pool cleaning vacuum thereto.

It is yet another objective of the invention to provide a pool cart that uses an improved mechanism to secure a pool cleaning vacuum thereto which uses a rapid latch system.

It is a still further objective of the invention to provide a pool cart that uses an improved mechanism to secure a pool cleaning vacuum thereto which uses a rapid latch system that maintains the pool vacuum cleaning head within a cradle.

It is a further objective of the invention to provide a pool cleaning vacuum head that utilizes an easily replaceable debris collection bag.

It is yet another objective of the invention to provide a pool cleaning vacuum head that quickly and easily connects to a pole.

It is a still further objective of the invention to provide a pool cleaning vacuum head that quickly and easily connects to a pole and minimizes wear on the vacuum head-pole connection point within the pool cleaning vacuum head.

Other objectives and advantages of this invention will become apparent from the following description taken in conjunction with any accompanying drawings wherein are set forth, by way of illustration and example, certain embodiments of this invention. Any drawings contained herein constitute a part of this specification, include exemplary embodiments of the present invention, and illustrate various objects and features thereof.

BRIEF DESCRIPTION OF THE FIGURES

FIG. 17A illustrates the securing of the pool cart to an upper portion of a vehicle mounting bracket;

FIG. 17B illustrates a close up view of the connection of the pool cleaning cart and transportation bracket illustrated in the broken line circle shown in FIG. 17A;

DETAILED DESCRIPTION OF THE INVENTION

Figure 1:
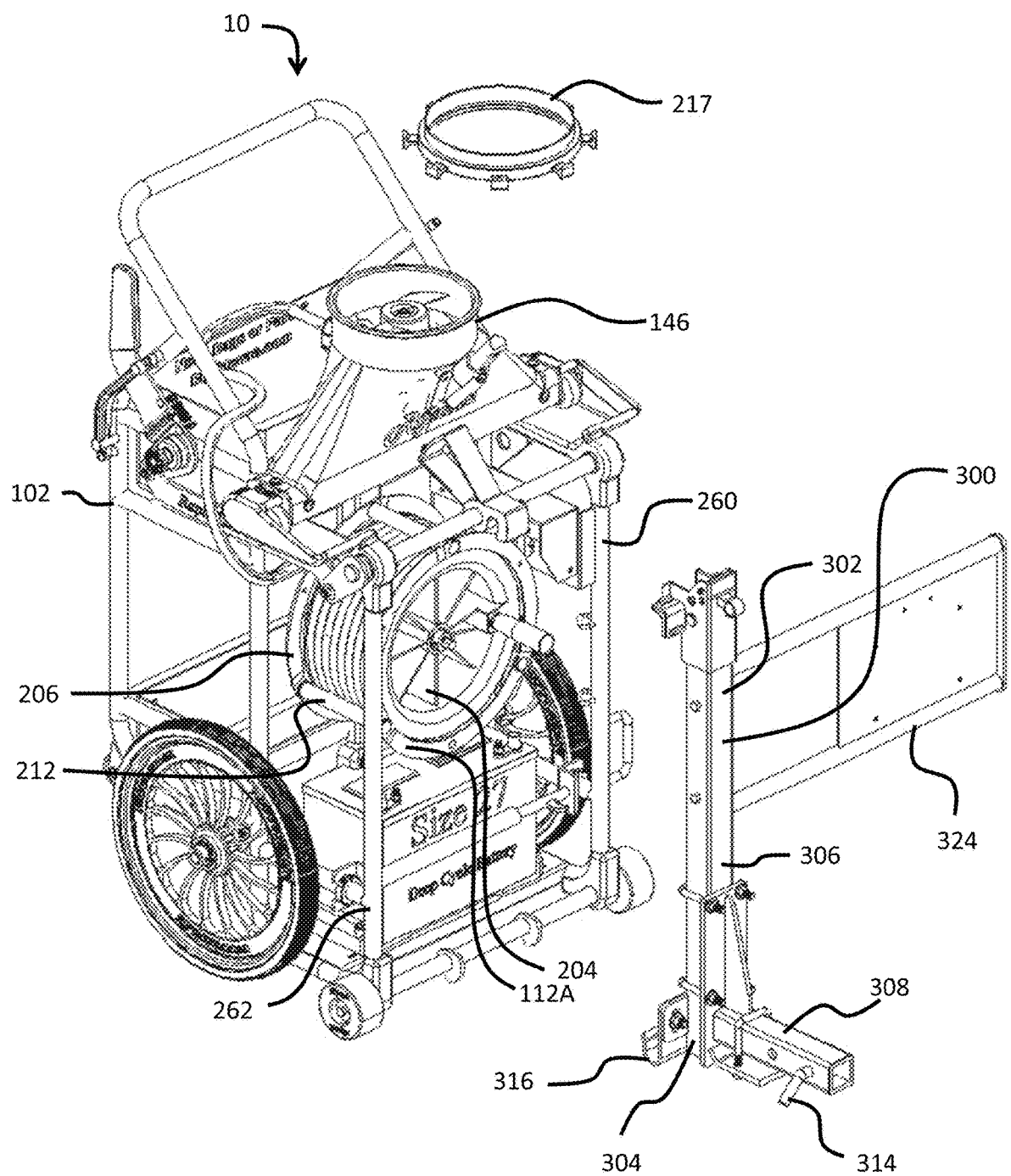
FIG. 1 is a perspective view of an embodiment of a pool cleaning system for use in cleaning pools.

While the present invention is susceptible of embodiment in various forms, there is shown in the drawings and will hereinafter be described a presently preferred, albeit not limiting, embodiment with the understanding that the present disclosure is to be considered an exemplification of the present invention and is not intended to limit the invention to the specific embodiments illustrated.

Referring to FIGS. 1-4B, an illustrative embodiment of a pool cleaning system for use in cleaning pools, referred to generally as a pool cleaning system 10, is shown. The pool cleaning system 10 contains a pool cleaning cart 100, a pool vacuum head 146, and a transportation bracket 300. The pool cleaning cart 100 is designed to easily store and move various pool cleaning equipment from site to site. The pool vacuum head 146 is configured to be attachable to a pole. The pool vacuum head 146 is designed to be used to clean one or more surfaces of the pool located below the surface of the water. The transportation bracket 300 is configured to allow the pool cleaning cart 100 to be secured to a vehicle.

The pool cleaning cart 100 comprises a frame 102 having two generally parallel, vertical bars 104 and 106, separated by a space 108. Bars 104 and 106 converge at point 110, with a portion of bar 106 extending above point 110 to form a portion of a horizontal handle bar 114. The horizontal handle bar 114 provides a mechanism for a user to push or pull the pool cleaning cart 100 in various directions. The frame 102 comprises a second set of generally parallel, vertical bars, 116 and 118, separated by a space 120. Bars 116 and 118 converge at point 122, with a portion of bar 118 extending above point 122 to form a portion of the horizontal handle bar 114. A plurality of horizontally arranged bars 124 connect vertical bars 104 and 106, vertical bars 116 and 118, or vertical bars 104 and 116 or 106 and 118. The plurality of horizontally arranged bars 124 provide stability to the frame 102, provide a base for which other components may be secured thereto, and define sections which frame areas for placement of containers 126 and 128. Containers 126 and 128 allow a user to store and transport additional pool supplies, such as chemicals. The frame 102 may use additional vertical or horizontal bars.

A first set of wheels 130 and axles 132, and a second set of wheels 134 and corresponding axles 136 are configured to secure to a portion of the frame 102 along each side. Wheels 130 and 134 are spaced apart and arranged along a same plane. A third set of wheels 138 and axles 140 are secured to a portion of the frame 102 so that, under normal usage, i.e. when wheels 130 and 134 are both in contact with a surface, wheels 138 are raised above and not in contact with the same surface. Wheels 138, therefore, allow a user to move the pool cleaning cart 100 along uneven surfaces, such as a curb 142 or stairs (not shown), see FIG. 4A and FIG. 4B. As shown in FIG. 4A, the pool cleaning cart 100 is positioned on a surface 137 in which wheels 130 abuts curb 142. In this position, wheels 138 are aligned above the curb 142. Once a user pulls down on the handle 114, lifting wheels 136 off the surface 137, wheels 138 are placed in contact with a surface 144 associated with curb 142, thereby making it easier to move the pool cleaning cart 100 past curb 142.

The pool cleaning cart 100 is designed to hold various devices which can be used to clean a pool. FIGS. 5A-8 illustrate an embodiment of a pool cleaning vacuum head 146. The pool cleaning vacuum head 146 is designed to be secured to a pole, fixed or telescoping, and inserted into the pool to clean surfaces located below the water. The pool cleaning vacuum head 146 contains a body 148, also referred to as a vacuum head outer housing unit that may be constructed of two or more parts and secured together using fastening, mechanical, chemical or bonding methods known to one of skill in the art. The body 148 is preferably rotational molded. Alternatively, the pool cleaning vacuum head body 148 may be constructed as a single unit.

Figure 6:
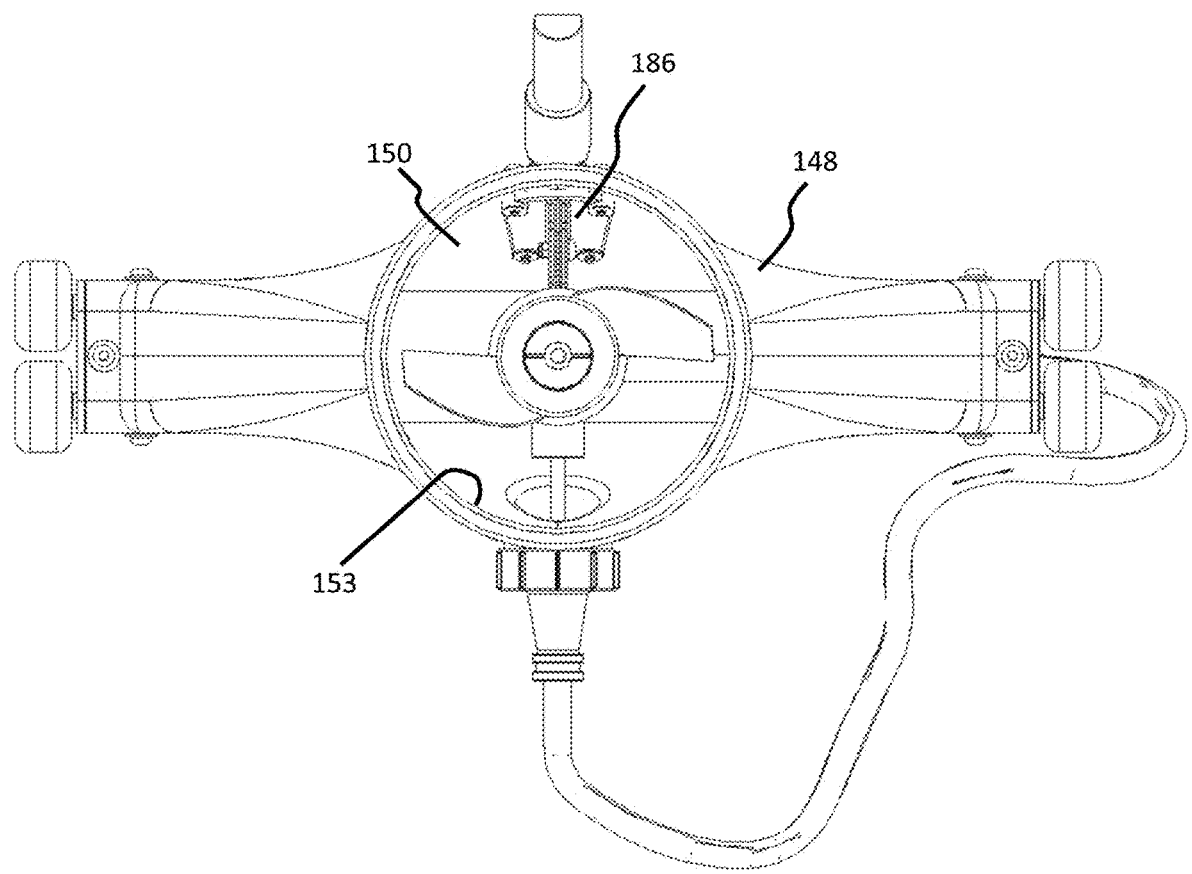
FIG. 6 is a top view of the pool vacuum head with the debris collection bag removed.
Figure 7:
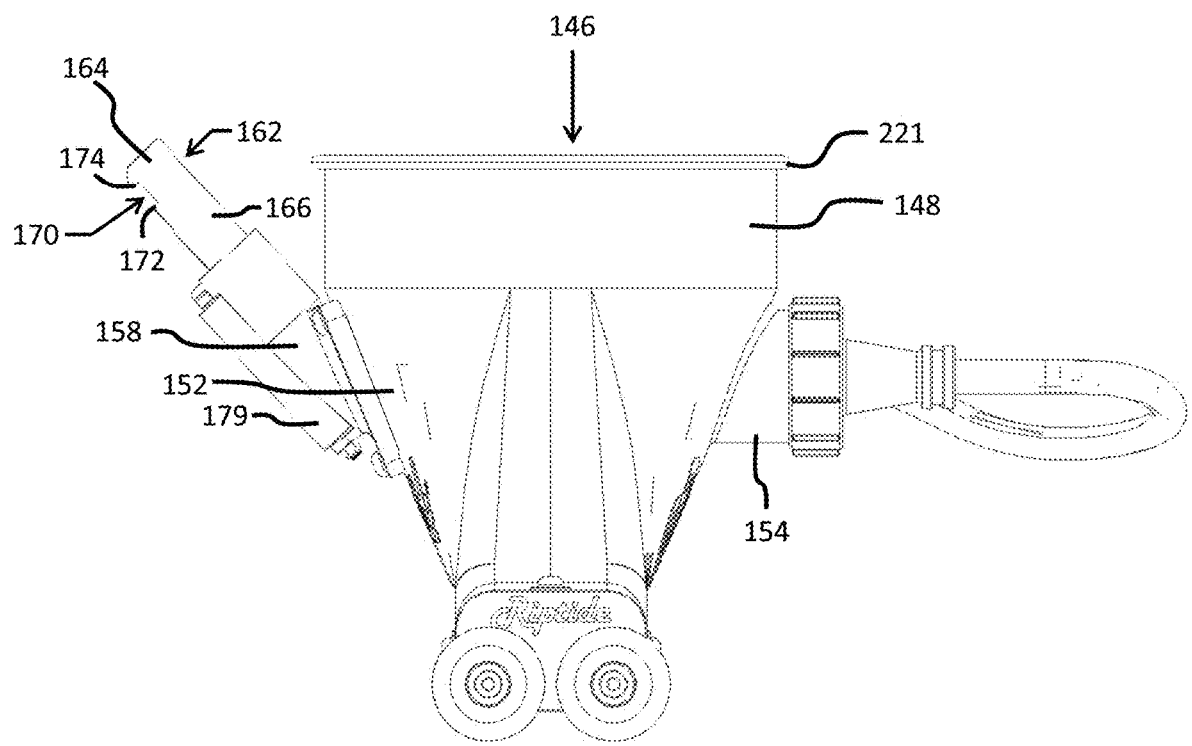
FIG. 7 is a side view of the pool vacuum head.
Figure 8:
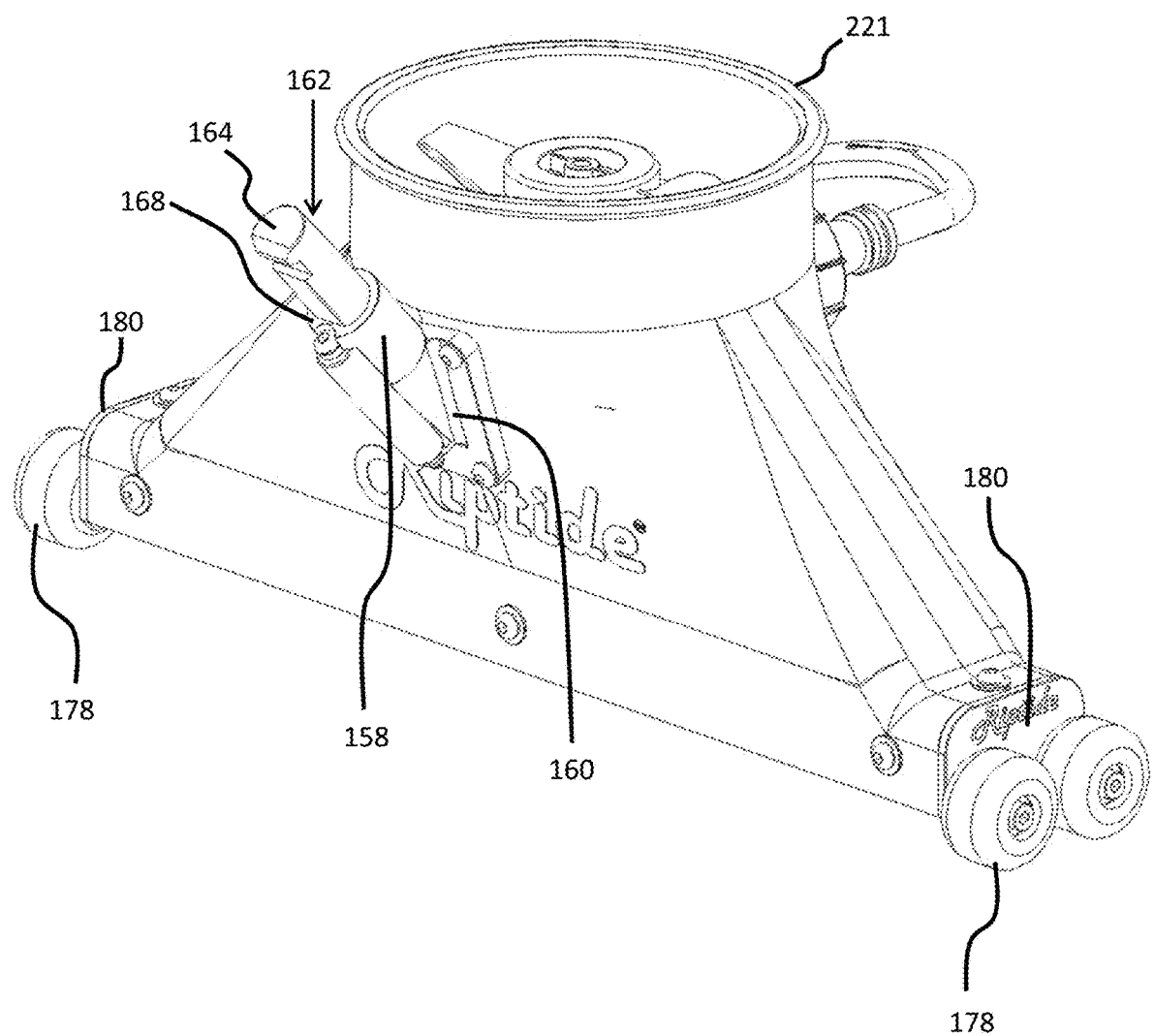
FIG. 8 is an alternative perspective view of the pool vacuum head.

The interior 150, see FIG. 6, is hollow and sized and shaped to receive a vacuum creating unit. The exterior surface 152 contains an outwardly extending member 154 with threading 155, having an opening 157 which extends into the interior 150 and is sized and shaped to receive one or more portions of an electrical connection assembly 156 (see FIG. 10). The exterior surface 152 may also contain a pole connecting member assembly 158. The pole connecting member assembly 158 is designed to quickly and easily secure to a pole coupler (described later) that is secured to a pole. The pole connecting member assembly 158 includes a bracket 160 for securing a pole connecting member 162. The pole connecting member 162 includes an elongated body 166 which extends outwardly away from a distal surface 168 of the pole connecting member assembly 158. The distal surface 168 of the bracket 160 is positioned around the perimeter of the elongated body 166 and forms a stop when a coupler is connected thereto. The elongated body 166 contains an end portion 164 designed to engage with the coupler. Unlike traditional pole connections that require prongs to fully engage the vacuum head, the pole connecting member 162 preferably secures to a pole with a pole coupler that uses a catch/snap and release mechanism. This mechanism is advantageous in that it reduces the wear associated with twisting and turning, extending the life of the pole. The elongated body 166 contains a channel 170 cut through the surface to provide two opposing, overhang attaching surfaces 172 and 174.

Figure 9A:
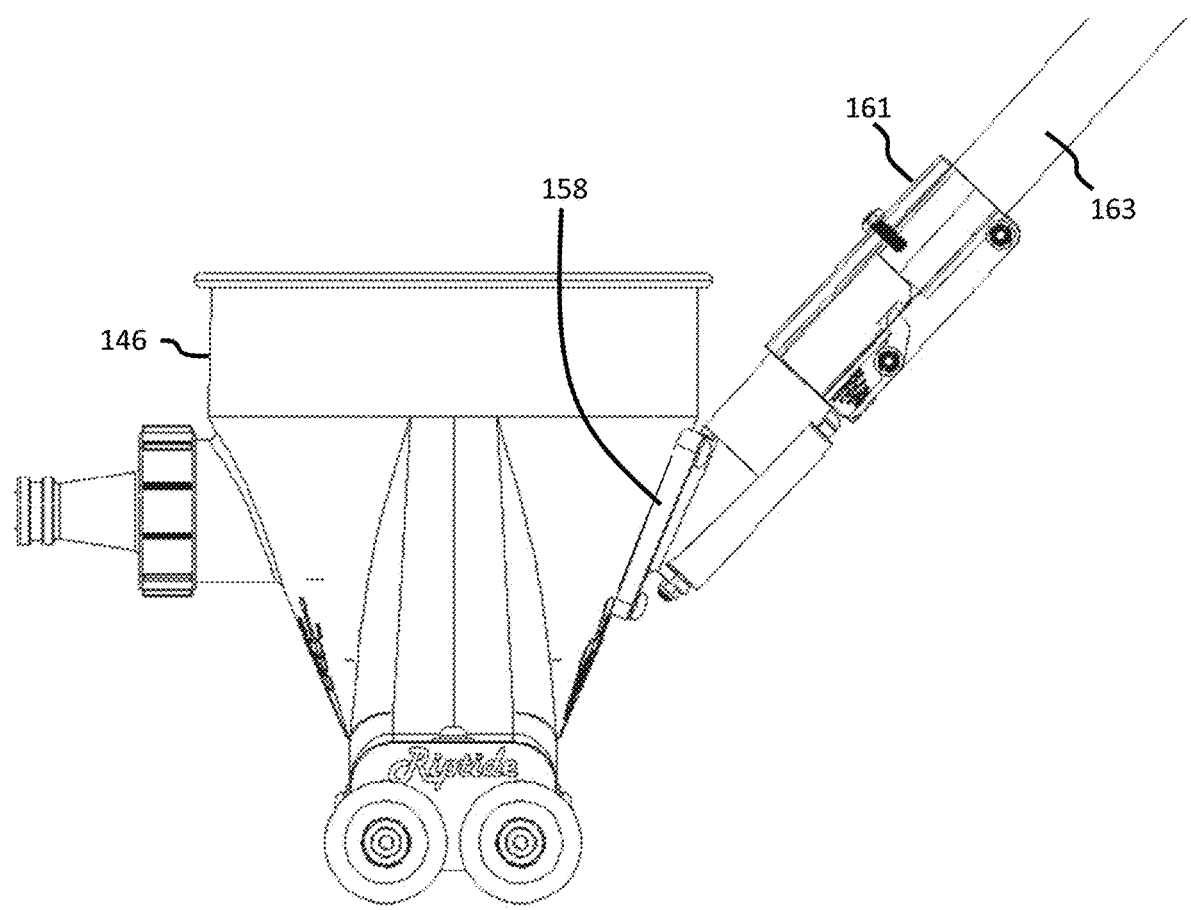
FIG. 9A illustrates an embodiment of a pole to vacuum head connection using a pole coupler.
Figure 9B:
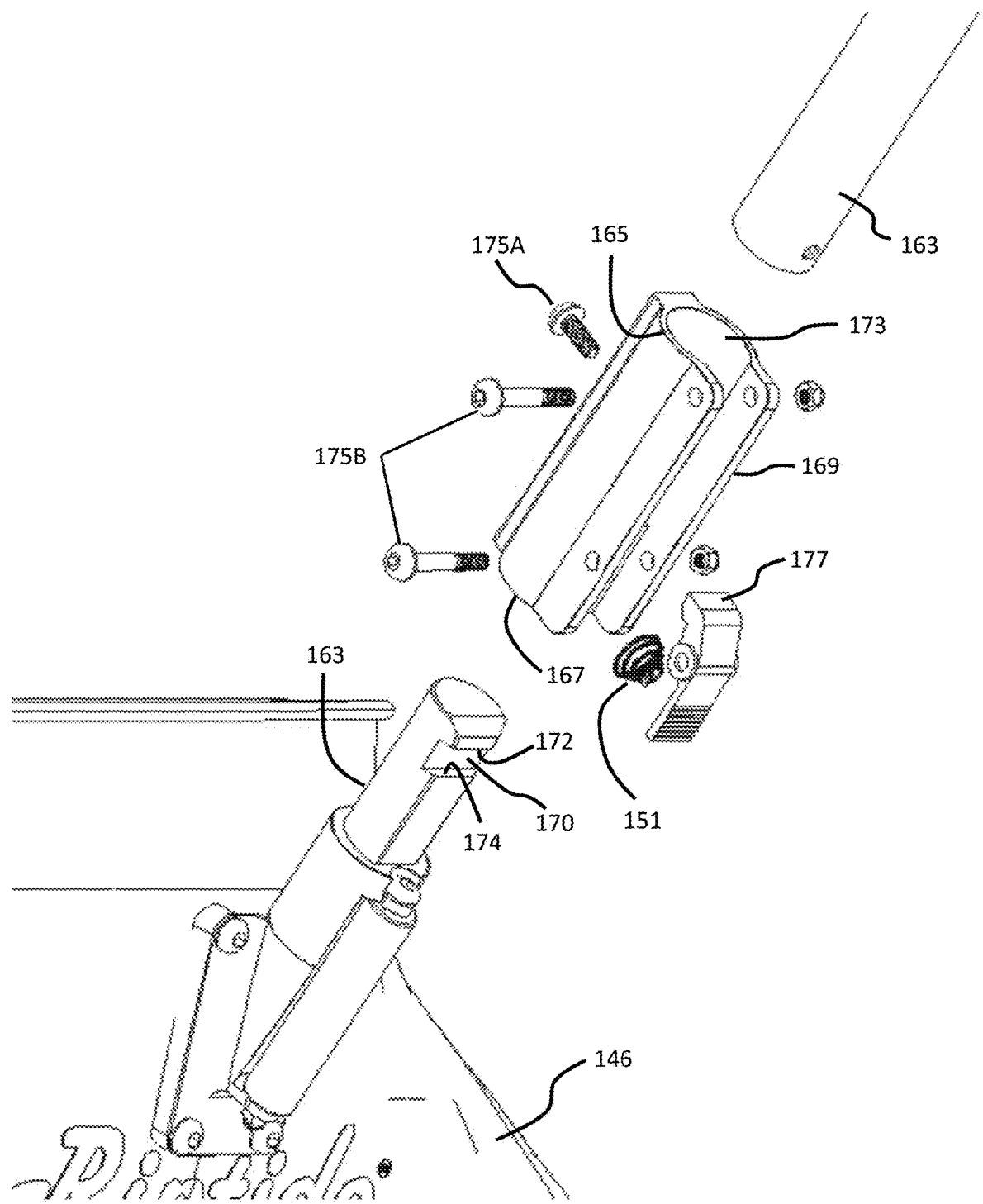
FIG. 9B is an exploded view of the pole to vacuum head connection using a pole coupler.
Figure 9C:
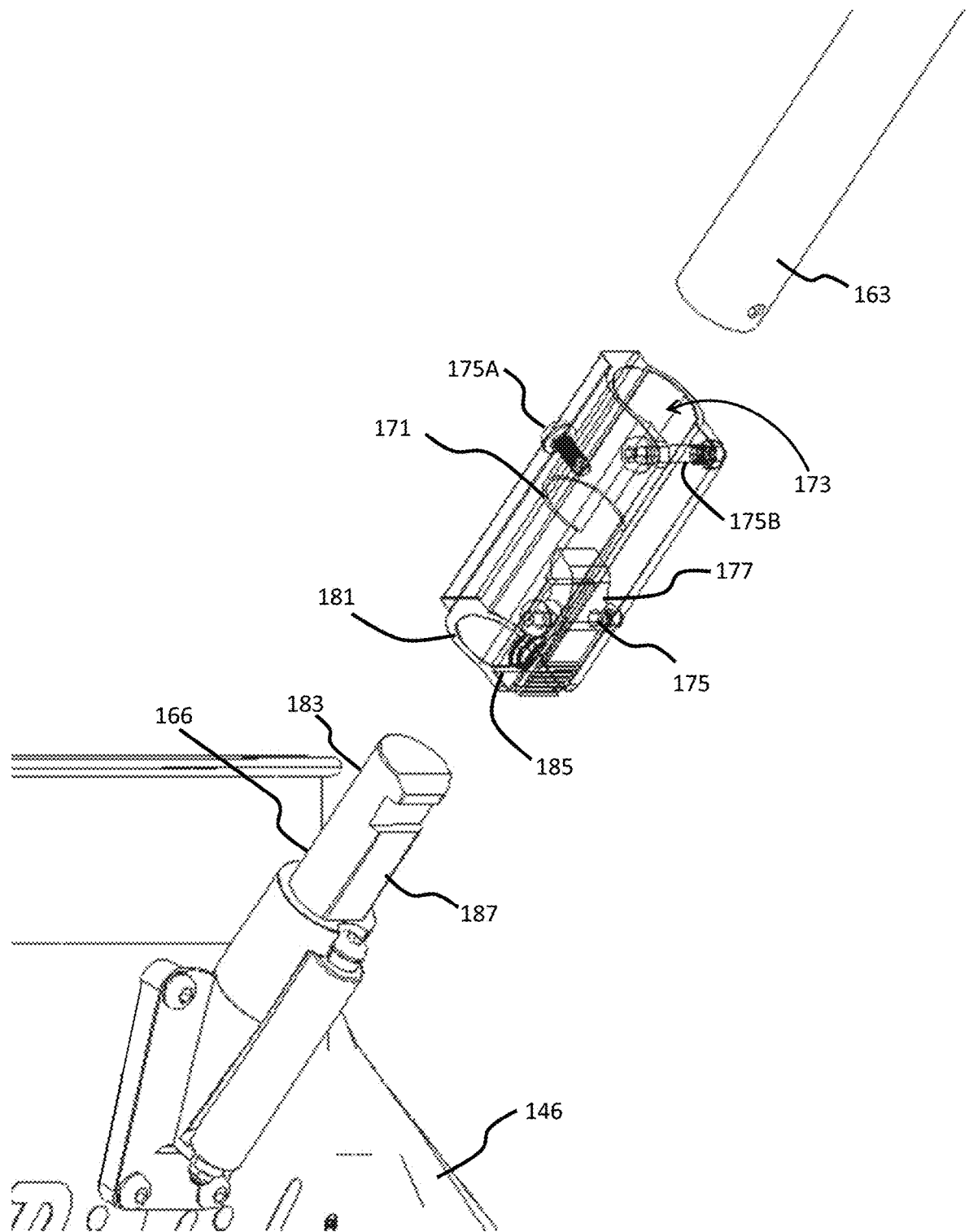
FIG. 9C is an exploded view of the pole to vacuum head connection using a pole coupler, with the pole coupler in a see through view.

FIGS. 9A-9C illustrate an embodiment of a pole coupler 161. The pole coupler 161 is configured to allow the pole 163 and the vacuum head to pole connecting member assembly 158 to connect together. The pole coupler 161 comprises a pole connecting end 165, a pole connecting member assembly connecting end 167, and a pole coupler main body 169. Pole 163 is inserted into pole connecting end 165. A pole seat 171 within the inner surface 173 of the pole coupler 161 prevents the pole 163 from sliding to the pole connecting member assembly connecting end 167. Once inserted and resting within, the pole 163 can be secured within by top screw 175A and side screws 175B. A spring loaded retaining hook 177 (spring 151) secures to the pole connecting member assembly 158, within channel 170 and rests against surface 172 or 174. Lifting the spring loaded retaining hook 177 allows the coupler to release from the pole connecting member assembly 158.

To prevent the pole coupler 161 from rotational movement about the pole connecting member assembly 158, the pole connecting member assembly connecting end 167 is configured to mirror the shape of the pole connecting member elongated body 166. As illustrated in FIG. 9C, the pole connecting member assembly connecting end 167 contains a semi-circular surface 181 which mirrors the semi-circular surface 183 configuration of the pole connecting member elongated body 166. The pole coupler 161 also comprises a generally planar surface 185 which mirrors the shape of the generally flat, planar surface 187 configuration of the pole connecting member elongated body 166. While the pole connecting member elongated body 166 is shown with a semi-circular surface configuration in combination with a flat, planar surface configuration, such shape is illustrative only. In a preferred embodiment, the pole connecting member elongated body 166 is configured to prevent the pole coupler 161 from rotational movement and can, therefore, be any shape, except completely rounded, that prevents rotation.

Figure 9D:
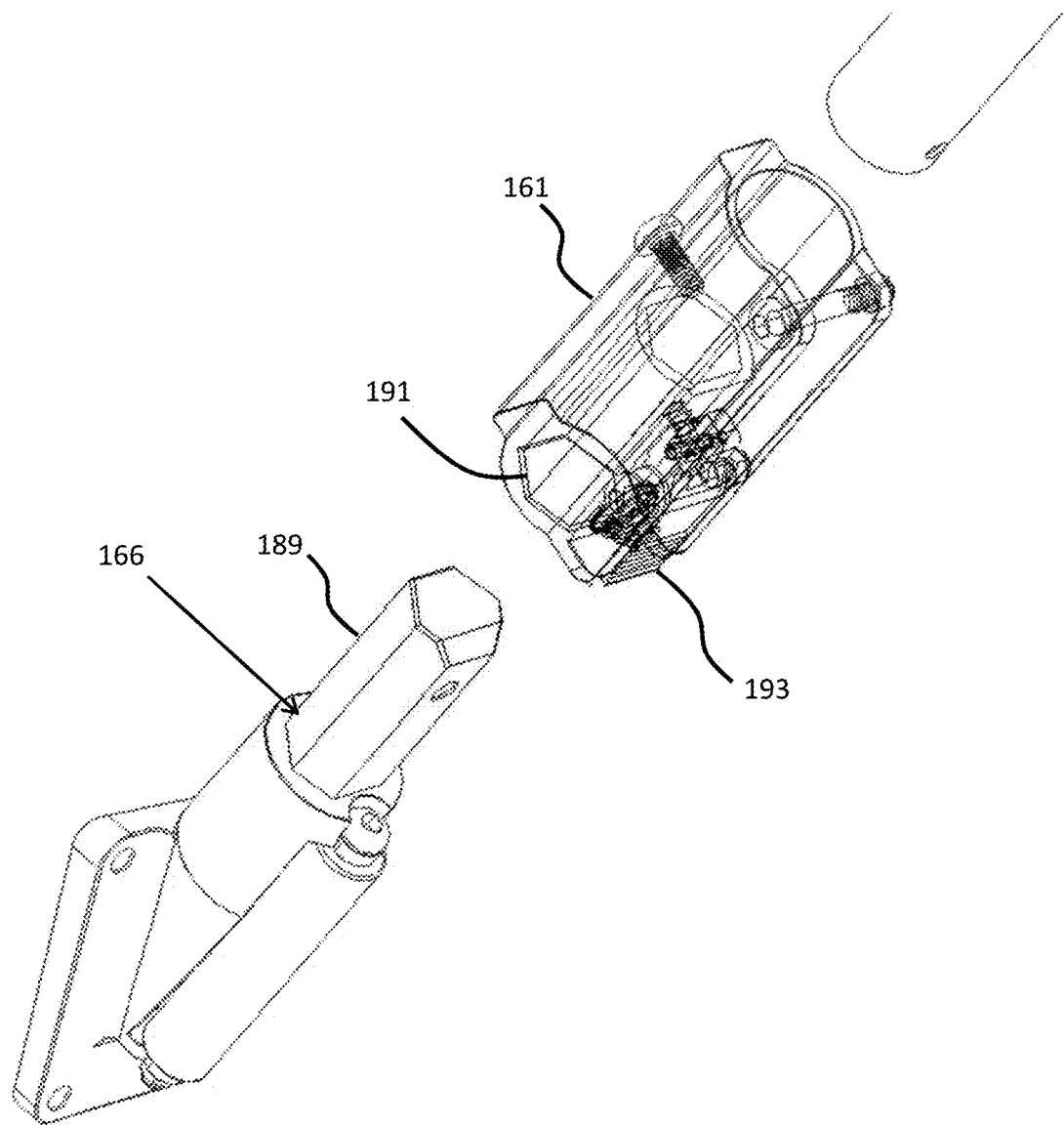
FIG. 9D is an exploded view of an alternative embodiment of the pole to vacuum head connection using a pole coupler.
Figure 9E:
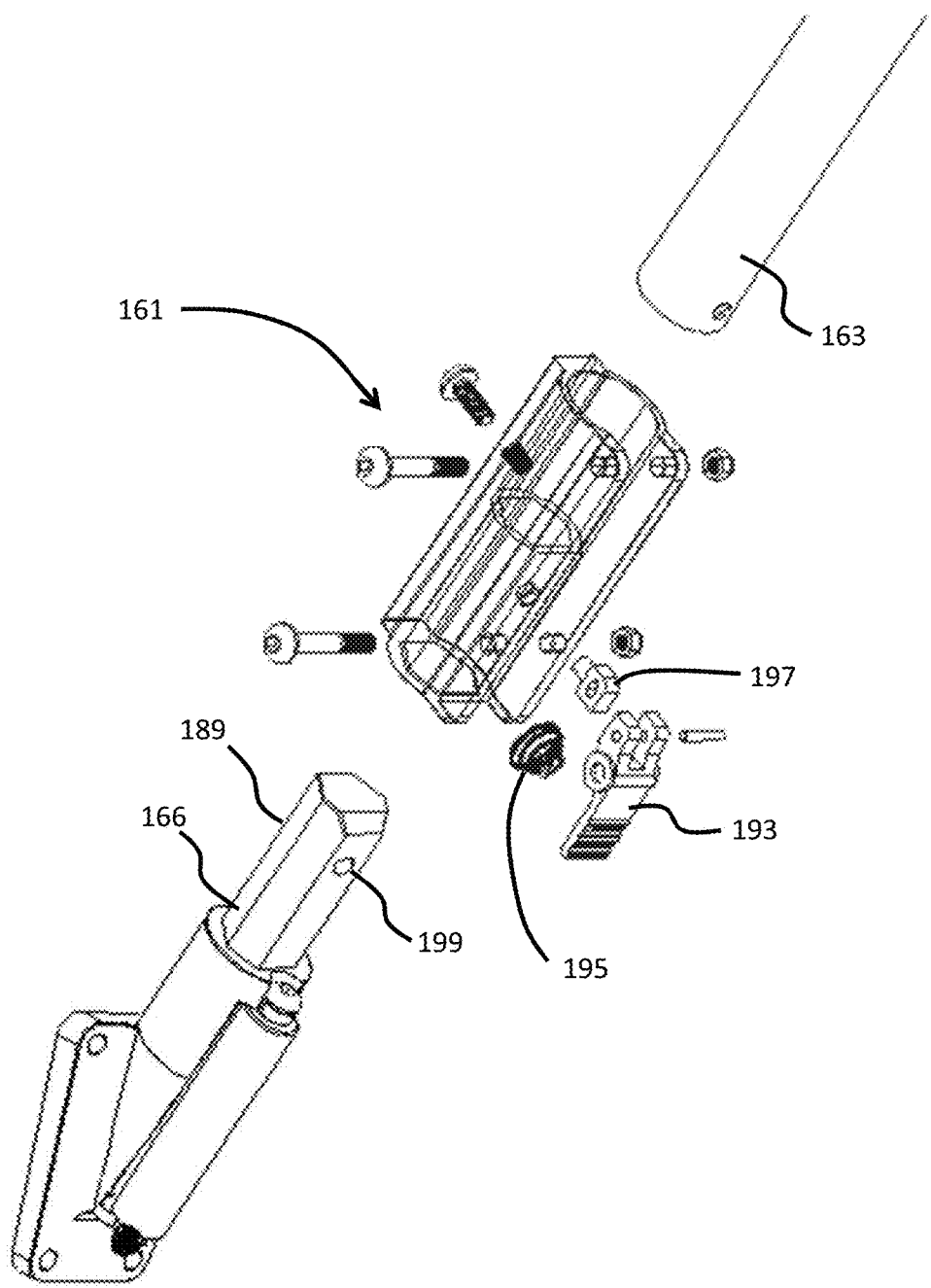
FIG. 9E is an exploded view of the pole to vacuum head connection using a pole coupler illustrated in FIG. 9C, with the pole coupler in a see through view.

FIG. 9D illustrates an alternative configuration for the pole connecting member elongated body 166. The pole connecting member elongated body 166 is shown with a hexagonally shaped body 189. Pole coupler 161 has a corresponding hexagonal surface 191. In addition, pole coupler 161 may also use a different coupling mechanism than the spring loaded retaining hook 177. As illustrated in FIG. 9E, the pole coupler 161 uses a spring loaded retaining pin 193 (spring 195) in which pin 197 secures within a pole connecting member elongated body opening 199.

The pole connecting member 162 may also include a roller 179 for use in horizontal movement along a step. Two sets of double outboard wheels 178, with the double wheels being adjacently arranged, aid in moving the pool cleaning vacuum head 146 about a surface. Preferably, the outboard wheels 178 are sized to extend out past the vacuum head body ends 149, see FIG. 5A, to allow tilting without scraping. Each set of outboard wheels 178 may be aligned about a same longitudinal axis. The two sets of outboard wheels 178 are attached to end plates 180 which help thread the wheels to a portion of the cleaning vacuum head 146. While it is preferable to have double wheels, a single wheel per each side may be used.

Figure 10:
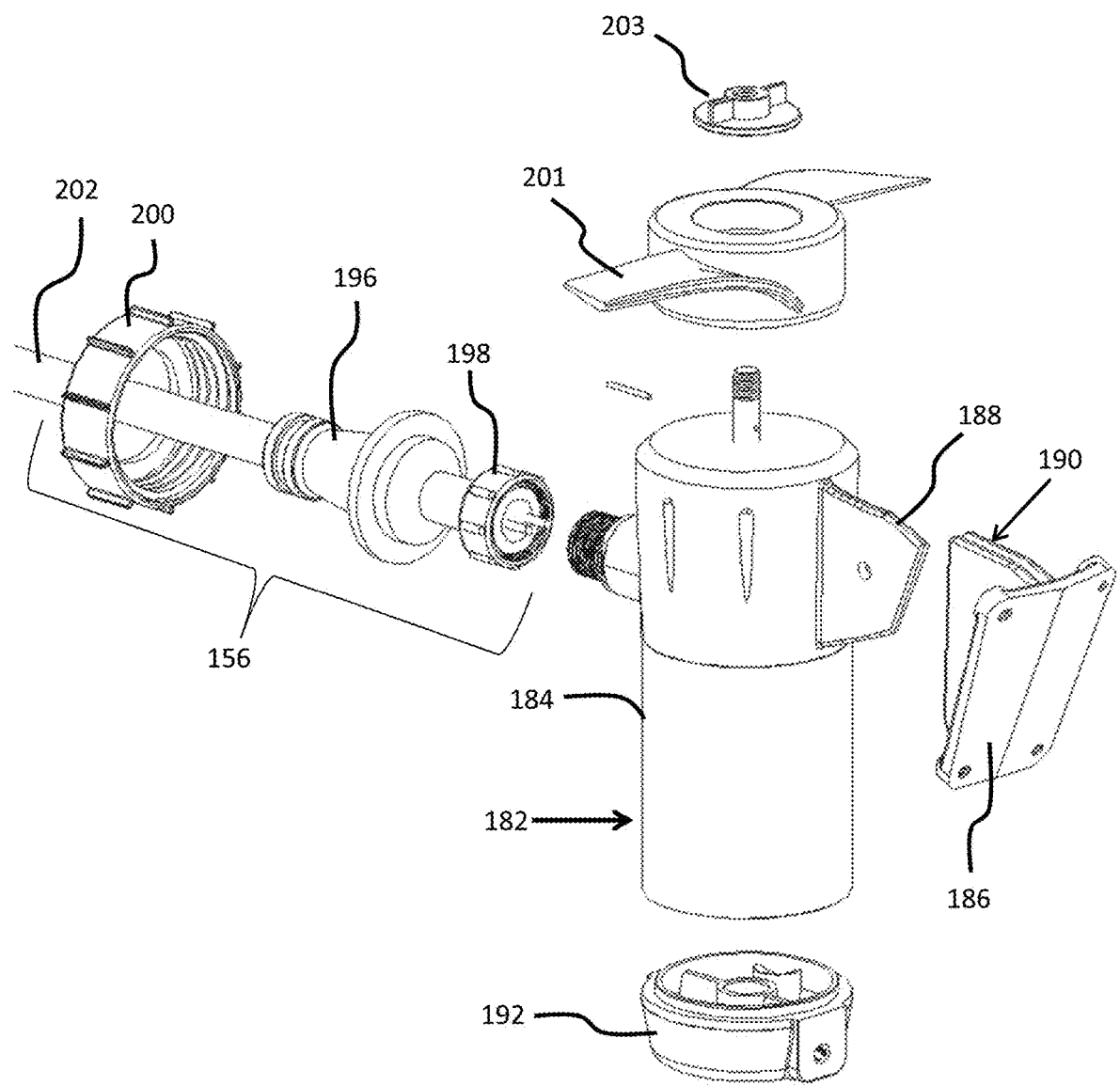
FIG. 10 is an exploded view of a vacuum producing unit and an electrical connection assembly.

The vacuum producing unit 182 is designed to provide a mechanism to remove debris from the surface of the pool and into a debris collection compartment. FIG. 10 shows an illustrative embodiment of a vacuum producing unit 182. In an illustrative embodiment, a trolling motor 184 with blades 201, wing nut 203, and mounting member 188 secures to the interior 150 through a motor bracket 186, see FIGS. 6 and 10. The mounting member 188, illustrated as a fin, is designed to fit within the slotted opening 190, thereby minimizing movement or vibration of the trolling motor 184. A nose cone 192 acts as a motor mount and stabilizes the vacuum case. Motor bracket 186 may be placed in the same location along the inner wall 153 as where the pole connecting member assembly bracket 160 is positioned along the outer surface of the vacuum head body to form a sandwich with the vacuum head body wall.

Figure 2:
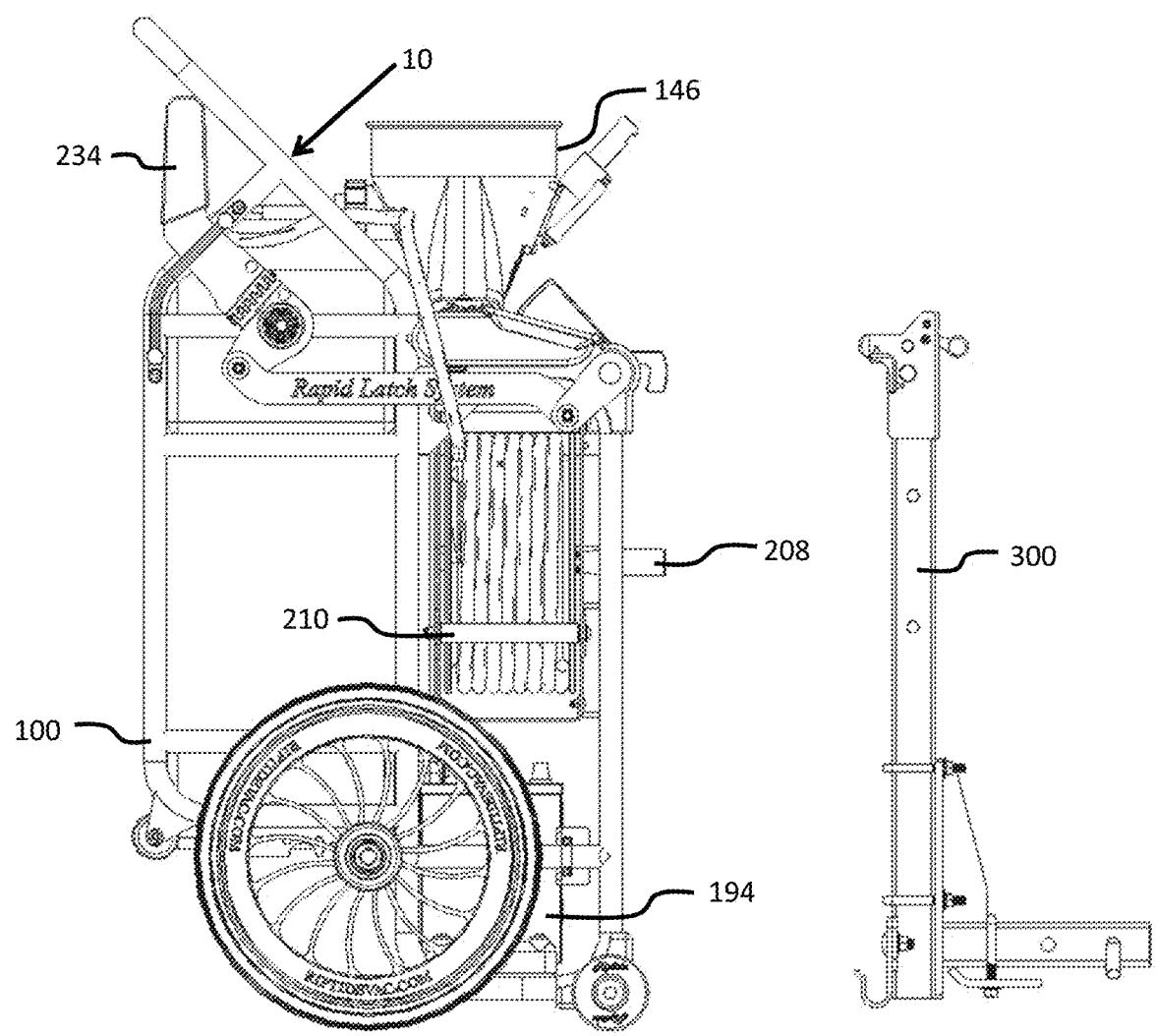
FIG. 2 is a side view of the pool cleaning system.
Figure 3:
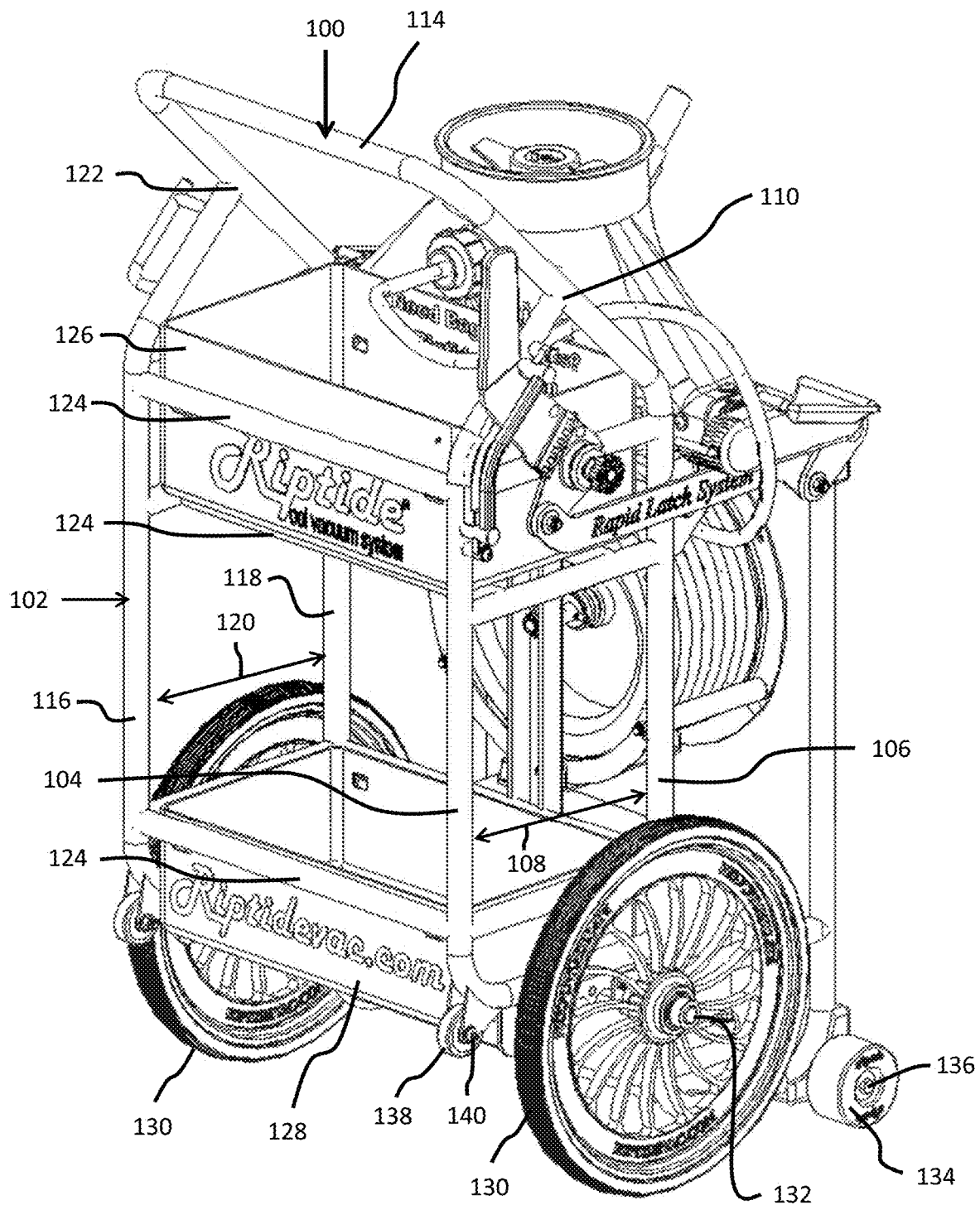
FIG. 3 is an alternative perspective view of the pool cleaning system.
Figure 4:
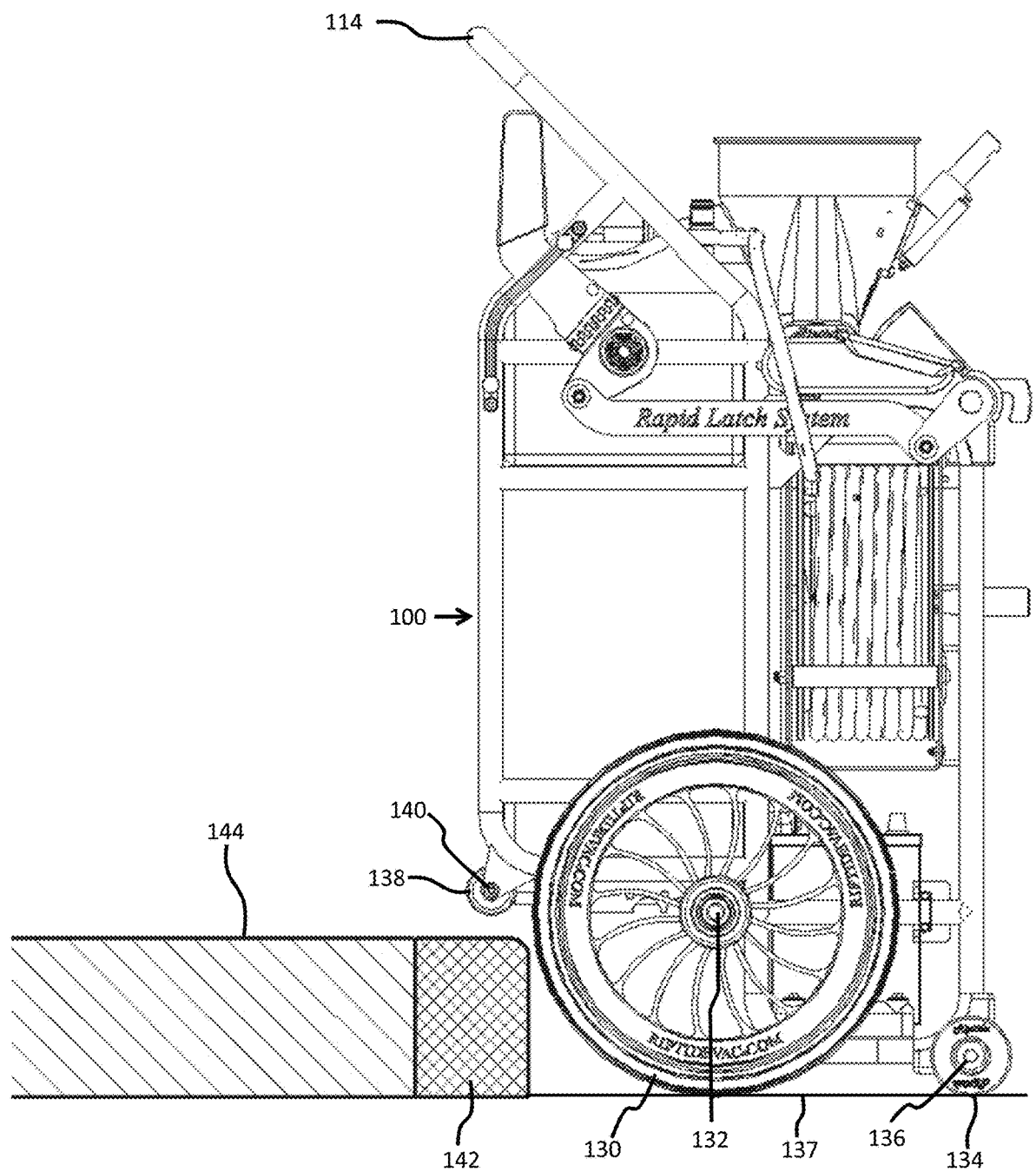
FIG. 4A illustrates the pool cleaning cart aligned next to a curb.
FIG. 4B illustrates the pool cleaning cart traversing the curb.
Figure 4:
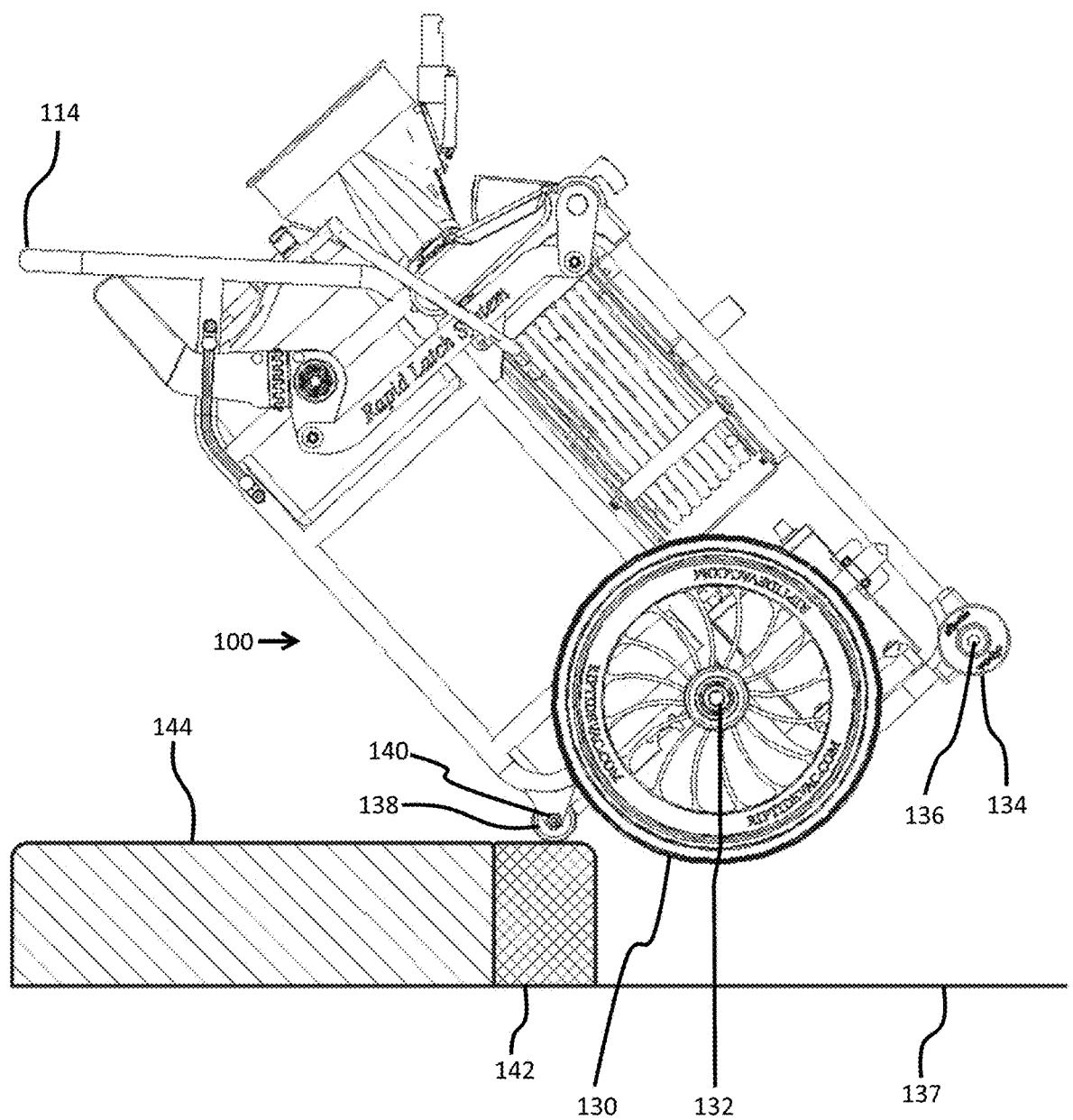
Figure 5:
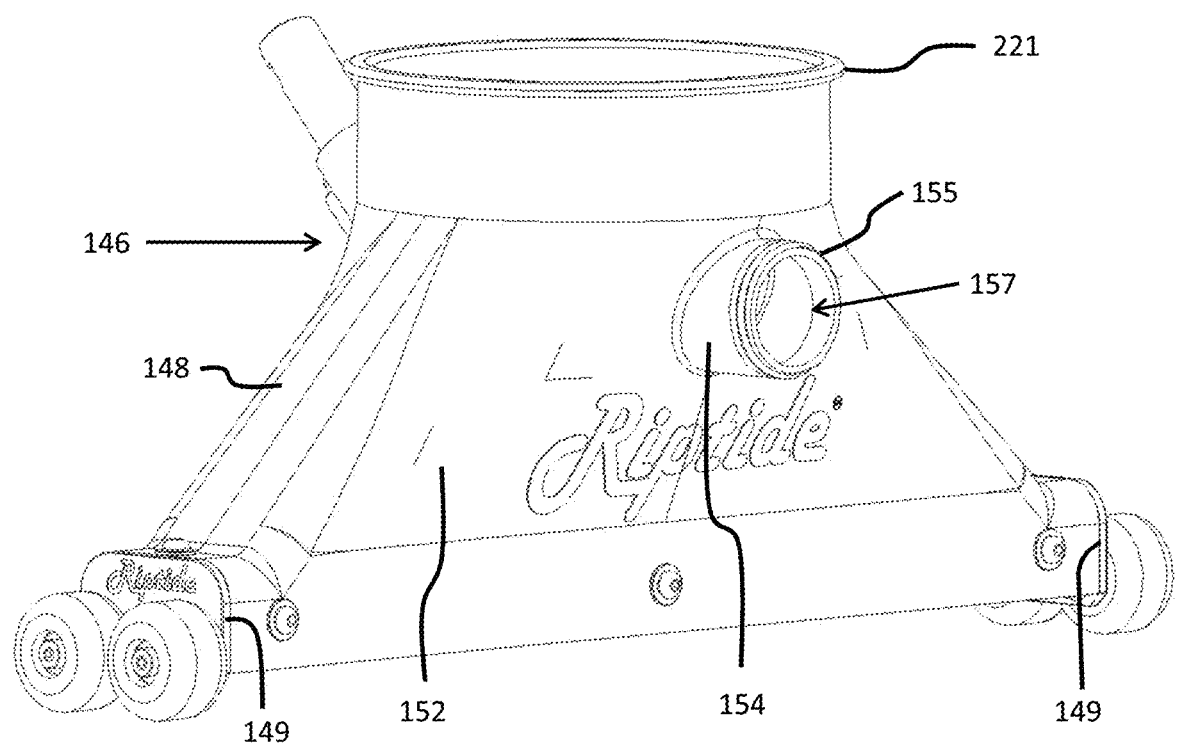
FIG. 5A is a perspective view of an embodiment of the pool vacuum head.
FIG. 5B illustrates the pool vacuum head with a debris collection bag attached thereto.
FIG. 5C illustrates the interior portion of the debris collection bag ring.
Figure 5:
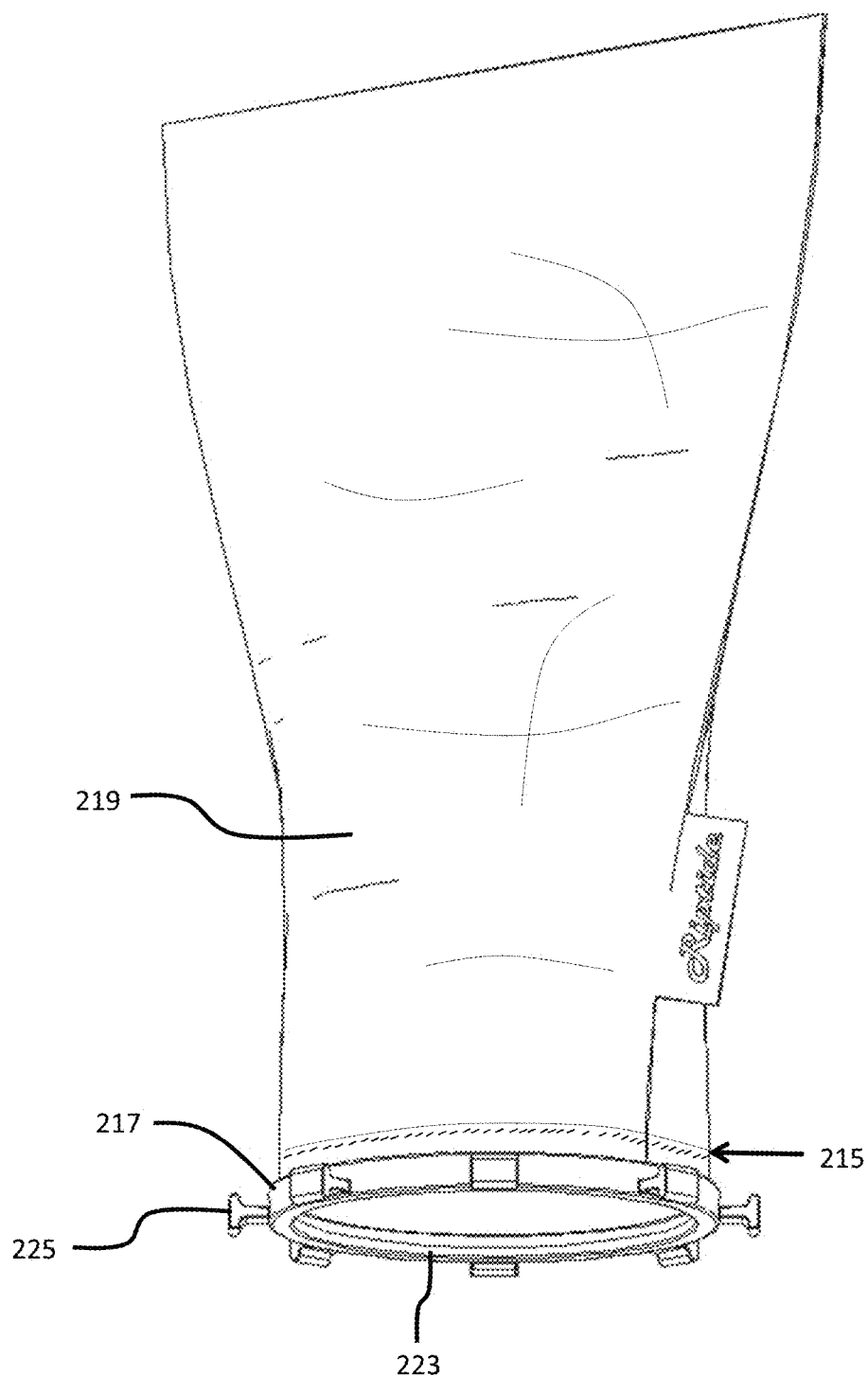
Figure 5:
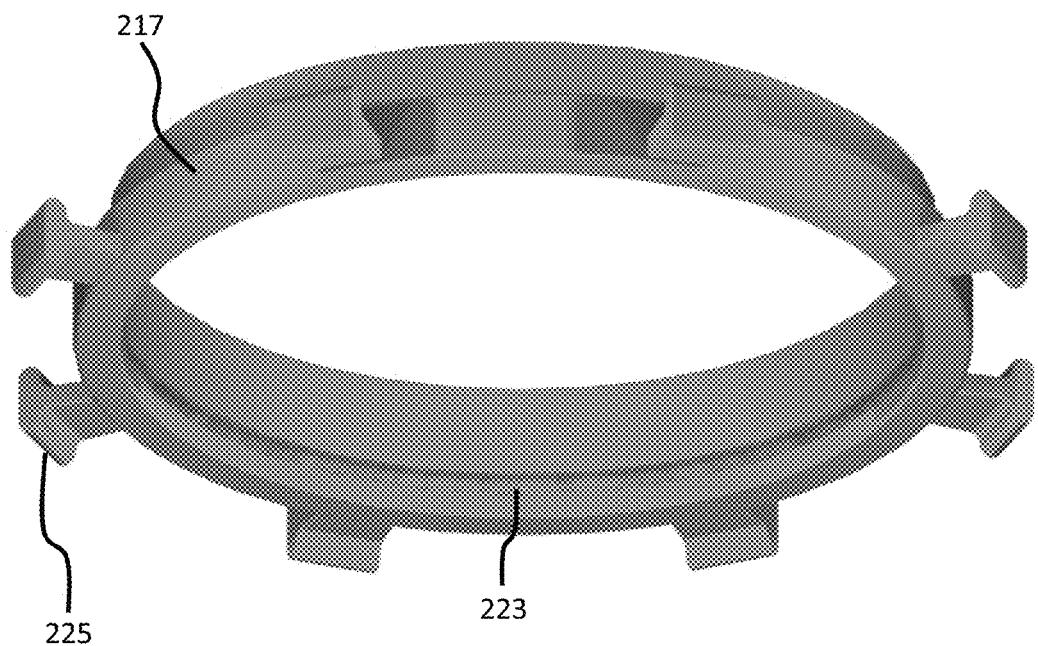
Figure 11:
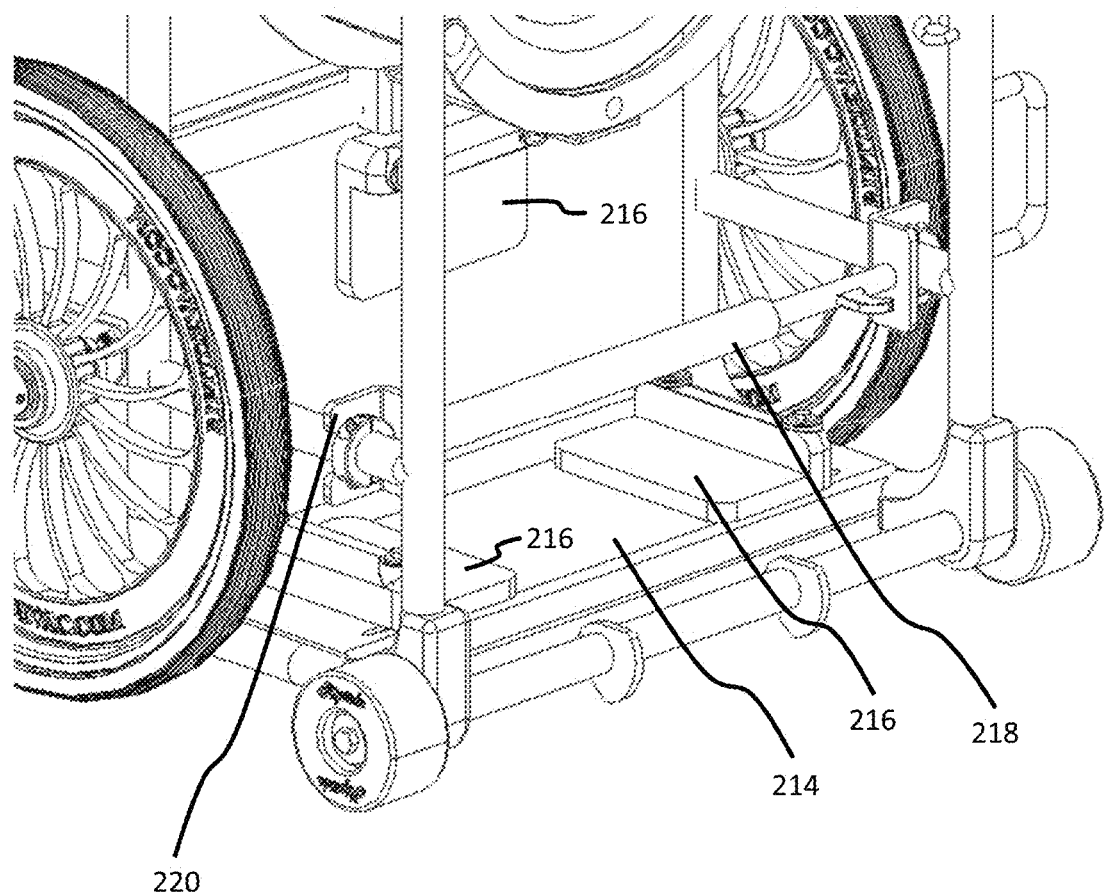
FIG. 11 illustrates a battery storage area.
Figure 18:
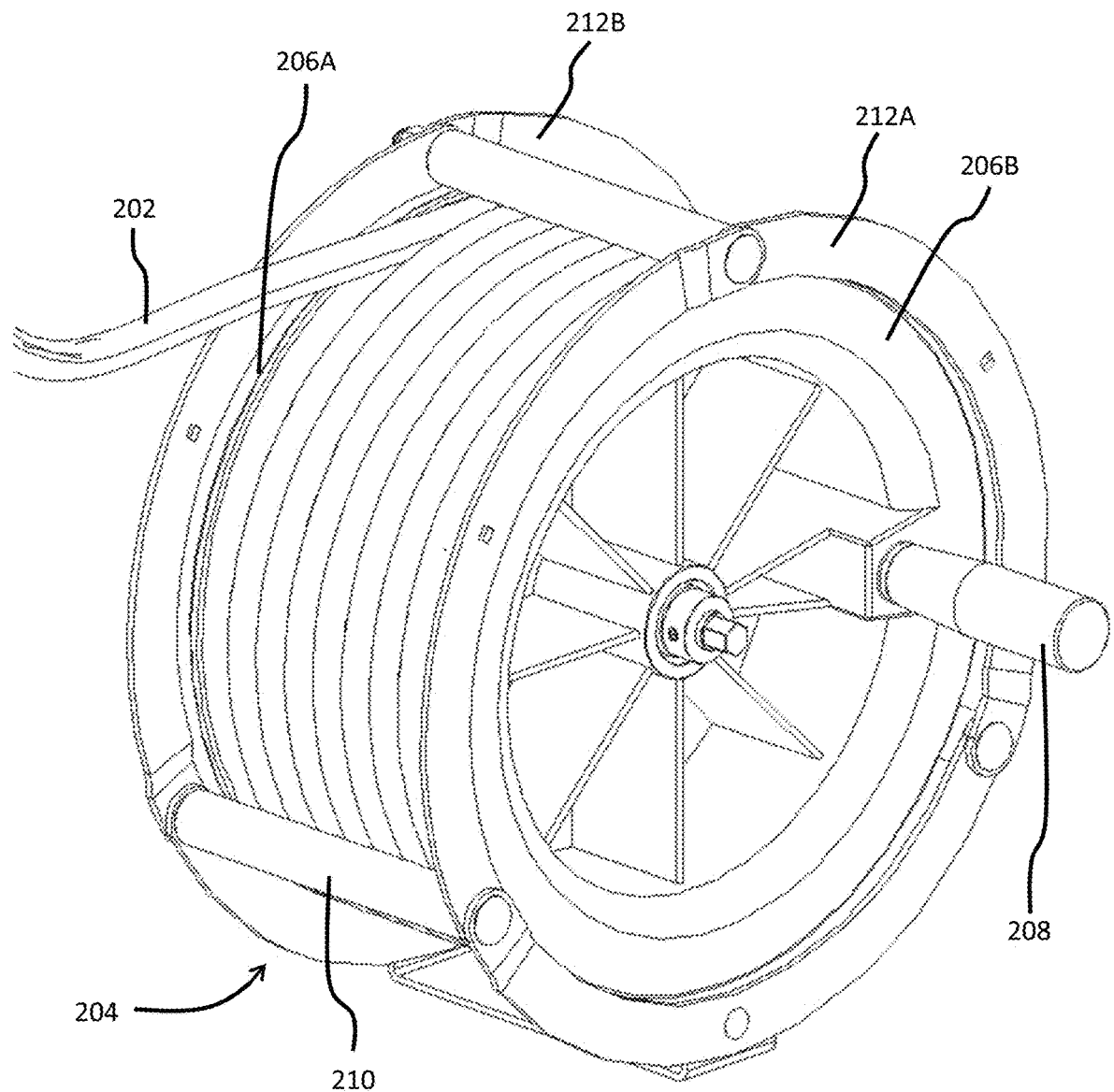
FIG. 18 is an illustrative example of a cord reel assembly.

Referring to FIGS. 2 and 10, the trolling motor 184 may be powered by battery 194. Grommet 196, quick disconnect 198 and collar 200 allow a cord 202 to pass through the pool cleaning vacuum head body 148 and attach to the motor 184. The cord 202 may be maintained in a wrapped position by a cord reel assembly 204, see also FIG. 18. The cord reel assembly 204 may contain two opposing wheels 206A and 206B about a drum (not shown). The cord reel assembly 204 can be manipulated by handle 208 so that a user can wind or unwind the cord depending on need. One or more cross-connectors 210 secure to rings 212A and 212B and may be used to prevent the cord from moving off the sides. The rings 212A and 212B may be sized to extend around the perimeter of two opposing wheels 206A and 206B. Referring to FIG. 11, a battery storage area 214 (with battery removed) located at the bottom portion of the frame 102 is illustrated. The battery storage area 214 may contain one or more adjustable pads 216, each configured to maintain the battery in a stable and secure orientation. To aid in replacing the battery quickly, a spring-loaded bar 218 with clamping end 220 may be used.

Debris and other material retrieved from the surfaces of the pool are preferably collected in a debris collection unit 215, see FIG. 5B. The debris collection unit 215 comprises a ring 217 with a mesh bag 219 attached thereto. Ring 217 is designed to snap fit onto a lip 221 (see FIG. 7 or 8) on the pool vacuum head 146. The ring 217 may contain a channel 223, see FIG. 5C, sized and shaped to interact with lip 221. While the debris collection unit 215 is described as snap fitting to the pool vacuum head 146, other mechanisms for securing the ring to the pool vacuum head 146 may be used. A plurality of knobs 225 arranged around a perimeter of the ring 217 and extending away from the middle of the ring 217 provide a mechanism to allow a user to easily attach or remove the ring 217 from the pool vacuum head 146.

Figure 12:
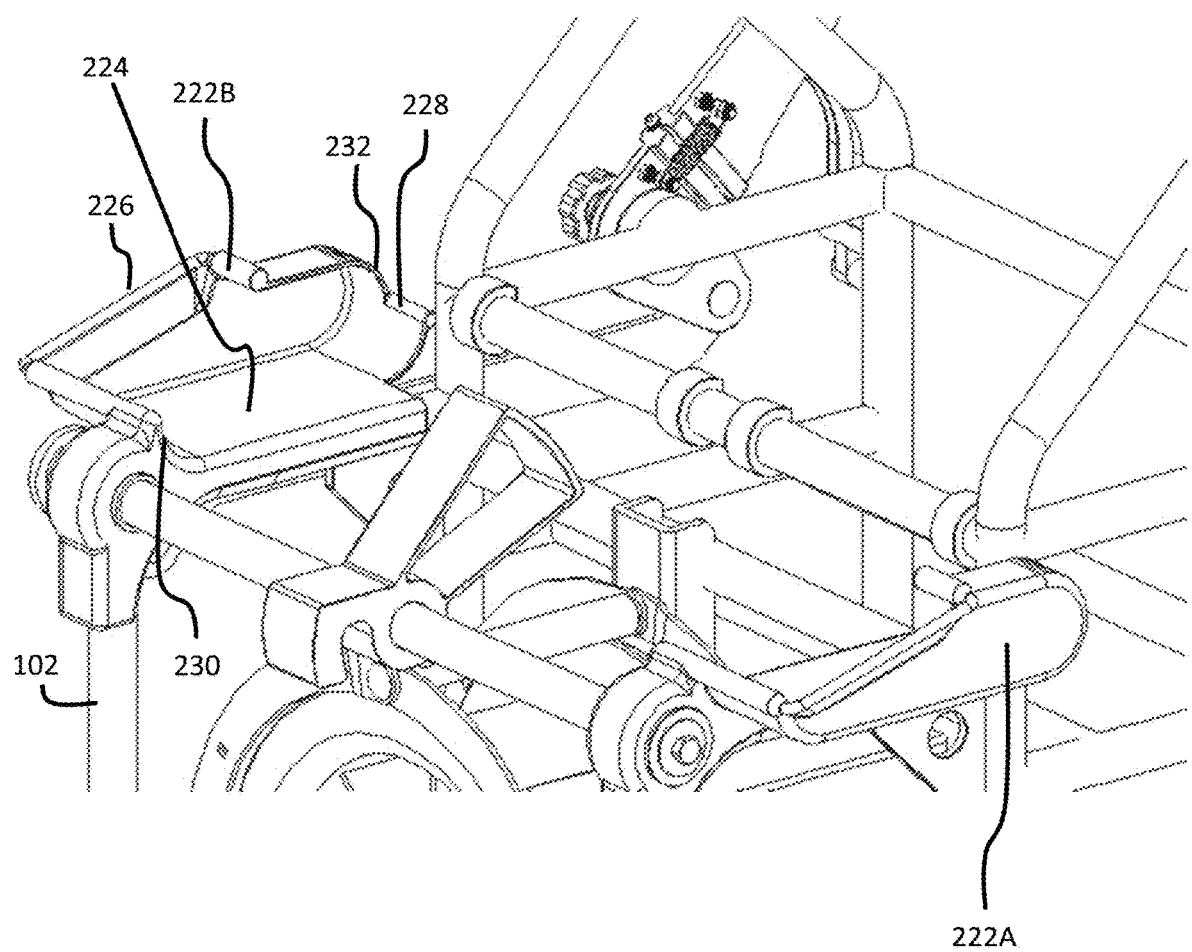
FIG. 12 illustrates the pool cart right side vacuum cradle and left side vacuum cradle.
Figure 13A:
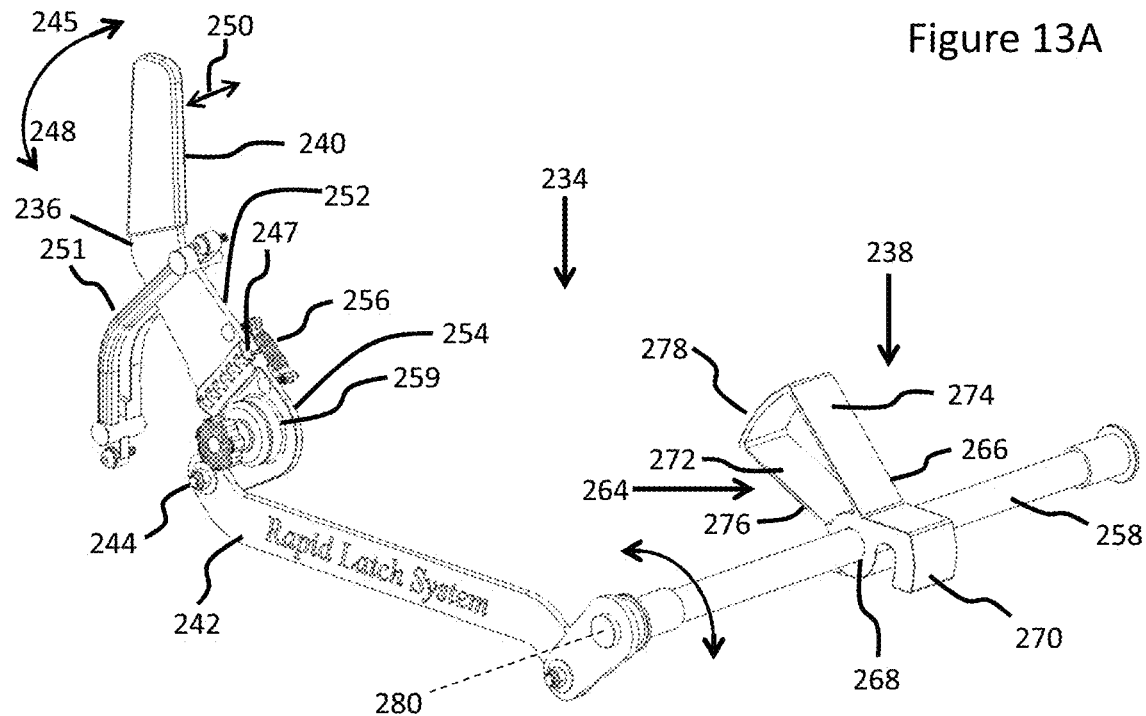
FIG. 13A is a perspective view of a rapid latch system.
Figure 13B:
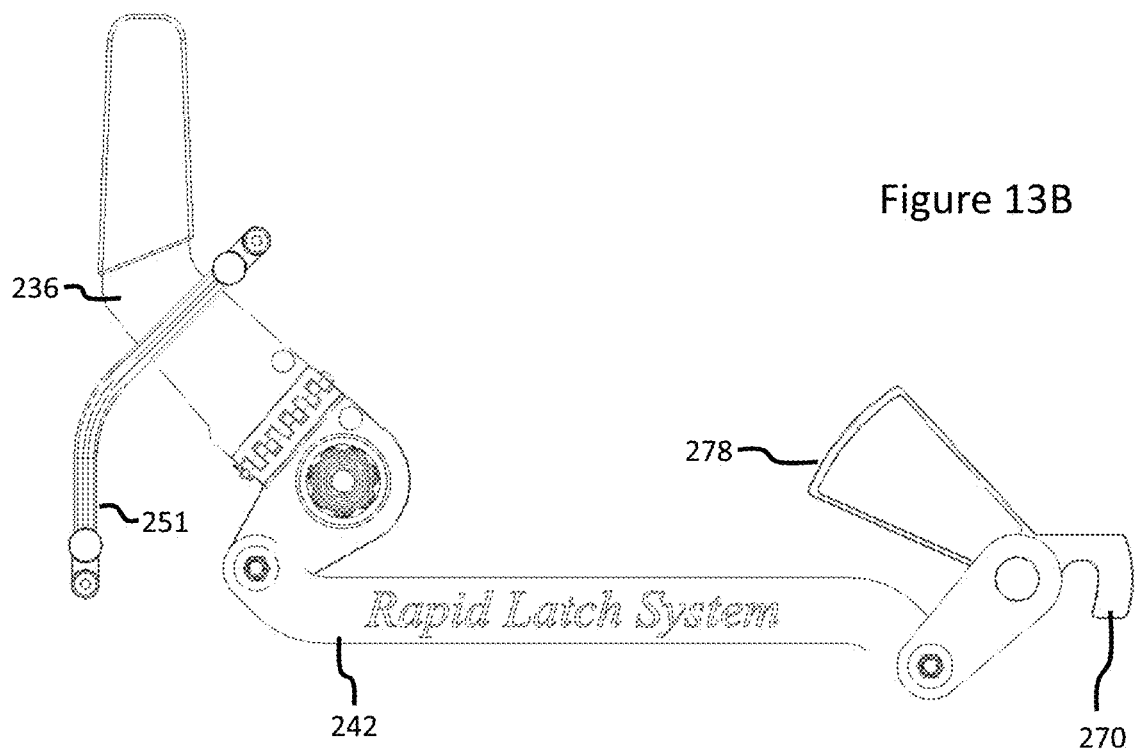
FIG. 13B is a side view of the rapid latch system.
Figure 13C:
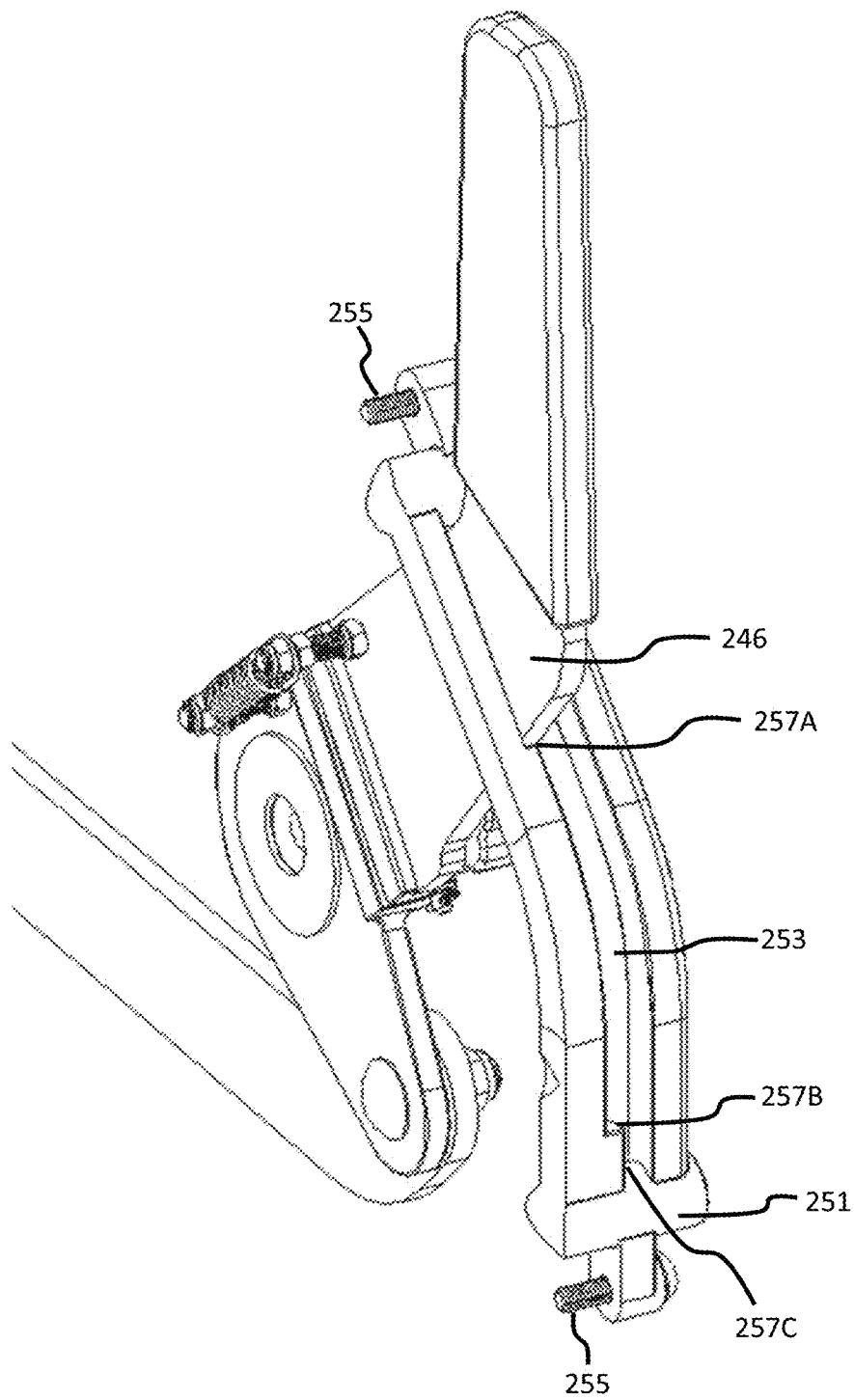
FIG. 13C is an alternative perspective view of the rapid latch system, illustrating an interior surface of a guide member.

To easily secure or remove the pool cleaning vacuum head 146 to/from the pool cleaning cart 100, the pool cleaning cart 100 contains several features. The pool cleaning vacuum head 146 is maintained on the frame 102 (see FIG. 12) by inclusion of a right side vacuum cradle 222A and a left side vacuum cradle 222B. The right side vacuum cradle 222A has the same construction and features as the left side vacuum cradle 222B. The left and right side vacuum cradles 222A and 222B comprise a bottom wall or surface 224, surrounded by a side wall 226 and two end walls 228 and 230. Side wall 226 may, but need not, contain a partially circular surface 232 configured to enclose the double outboard wheels 178 in a locked position. The end wall 228 is also partially curved to prevent the pool cleaning vacuum head 146 from rolling. The double outboard wheels 178 are not required to be enclosed by a wall. The end wall 230 is angled relative to the bottom wall or surface 224. The angled end wall 230 helps maintain the position of the pool cleaning vacuum head 146 when in a second, unsecured position.

Figure 14:
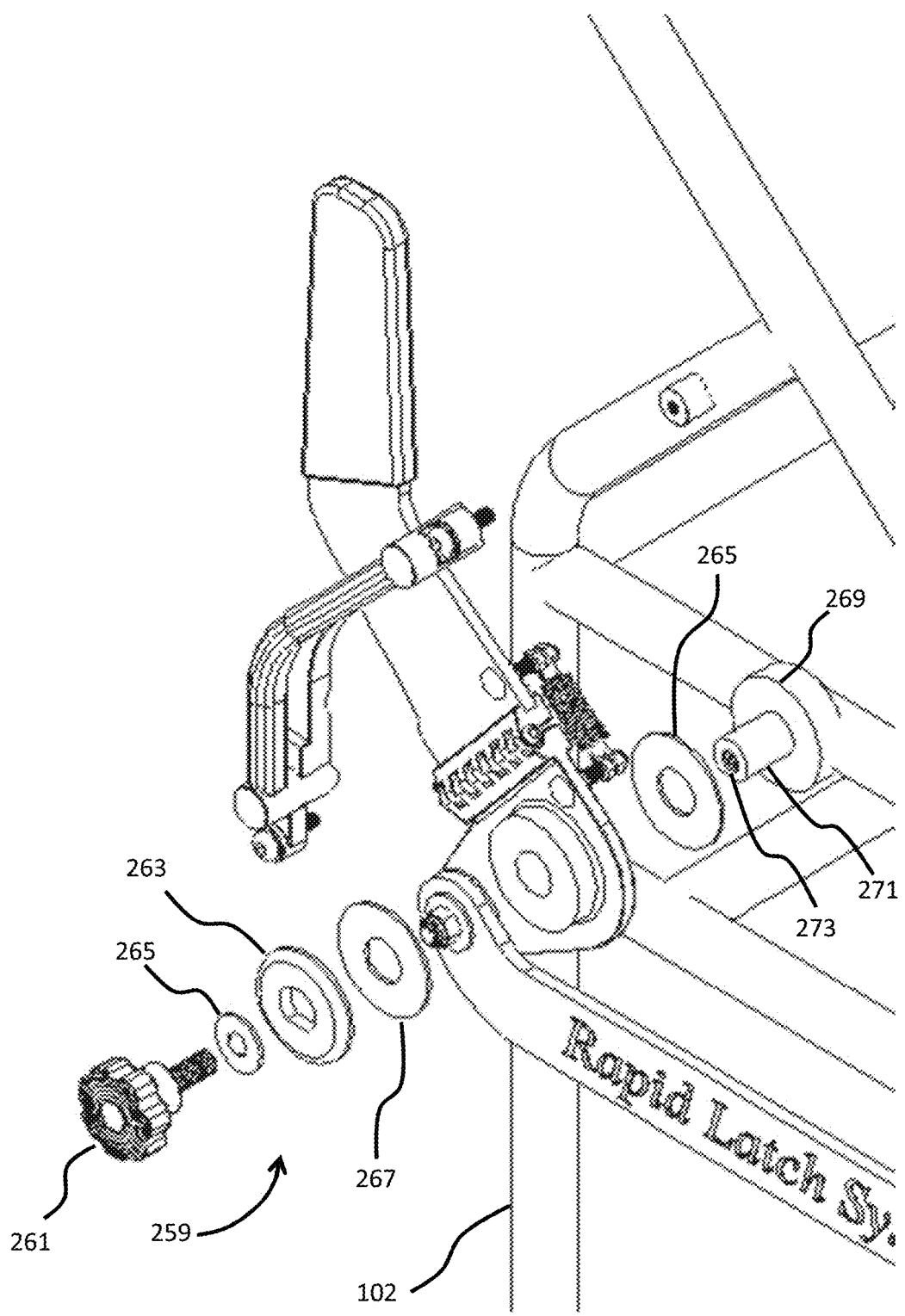
FIG. 14 illustrates a tension adjustment assembly.

The pool cleaning cart 100 utilizes a rapid latch release system 234, see FIG. 2 and FIG. 13A-C, to maintain the pool cleaning vacuum head 146 in the first secured position, and the second position in which pool cleaning vacuum head 146 may be removed from the cradle and cart. In the first secured position, the pool cleaning vacuum head 146 is secured to the right side vacuum cradle 222A and left side vacuum cradle 222B. Manipulation of the rapid latch release system 234 allows the pool cleaning vacuum head 146 to be removed from the pool cleaning cart 100. The rapid latch release system 234 comprises a lever arm 236 rotatably connected to a pool cleaning vacuum head locking assembly 238. The lever arm 236 comprises a first portion handle 240 connected to a second portion elongated body 242 at a pivot 244. As the user manipulates the handle 240 (by moving it in a side to side or up/down direction, see arrows 245 and 248), the second portion elongated body 242 moves correspondingly, causing the pool cleaning vacuum head locking assembly 238 to rotate in one or more directions. Handle 240 may comprise a first member 252 and a second member 254 secured together through a spring 256 and hinge 247, thereby allowing the handle 240 to be manipulated by the user in a side to side manner without moving the second portion elongated body 242. The ease at which the handle 240 may be manipulated can be controlled by lever handle tension adjustment assembly 259. As shown in FIG. 14, lever handle tension adjustment assembly 259 comprises an adjustment knob 261, a thrust plate 263 sandwiched between a washer 265 and a thrust washer 267, a lever pivot 269, and a cart frame engagement member 269 having a elongated body 271 having a threaded, internal lumen 273 for receiving a portion of adjustment knob 261. A guide member 251, having a slotted opening 253 sized to allow the handle to rest within, secures to one or more portions of the frame 102 through bolts or screws 255. A portion of the handle 240 can be moved to rest onto a plurality of stepped surfaces, a first stepped surface 257A, a second stepped surface 257B, and a full release surface 257C, positioned within the guide member 251.

The pool cleaning vacuum head locking assembly 238 is designed to 1) lock onto/unlock from the transportation bracket 300, and 2) maintain the pool cleaning vacuum head 146 in a secured position to the pool cleaning cart 100. The pool cleaning vacuum head locking assembly 238 comprises an elongated body 258 that spans the distance between frame 102 vertical bars 260 and 262. The pool cleaning vacuum head locking assembly elongated body 258 is secured to the vertical bars 260 and 262 in a manner that allows the body 258 to rotate. A dual sided engaging member 264 comprising a main body 266 with an opening 268 having a diameter that is larger than the diameter of the pool cleaning vacuum head locking assembly elongated body 258. The dual sided engaging member 264 is preferably secured to the outer perimeter of the pool cleaning vacuum head locking assembly elongated body 258 in a fixed position.

The pool cleaning vacuum head engaging member 264 comprises a vehicle mounting bracket locking component, illustrated herein as a U-shaped hooked member 270 sized and shaped to engage with a portion of the transportation bracket 300. A pool cleaning vacuum head locking component 272 is configured to engage with a portion of the pool cleaning vacuum head 146. The pool cleaning vacuum head locking component 272 illustrated herein contains two separated side walls 274 and 276 connected by an end wall 278. Both side walls 274 and 276 are arranged at an angle relative to a pool cleaning vacuum head locking assembly elongated body longitudinal axis 280. In this arrangement, as the pool cleaning vacuum head locking assembly elongated body 258 is rotated, a vehicle mounting bracket locking component, illustrated herein as a U-shaped hooked member 270, and the pool cleaning vacuum head locking component 272 are maintained in different orientations or planes.

Figure 15A:
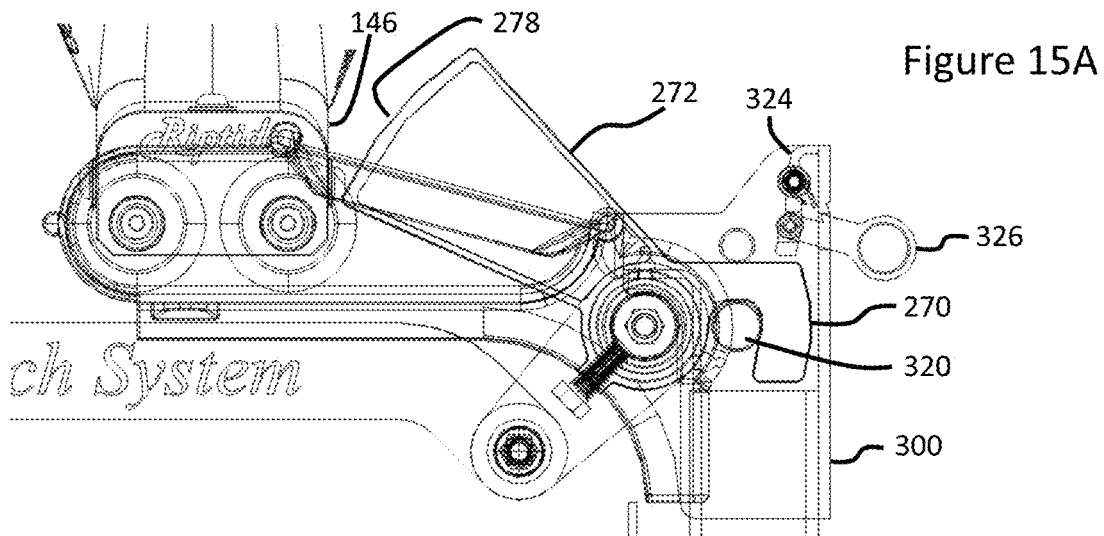
FIG. 15A illustrates the rapid latch system in a position in which the pool cleaning vacuum head is locked onto the cart and the cart is locked onto a transportation rack.
Figure 15B:
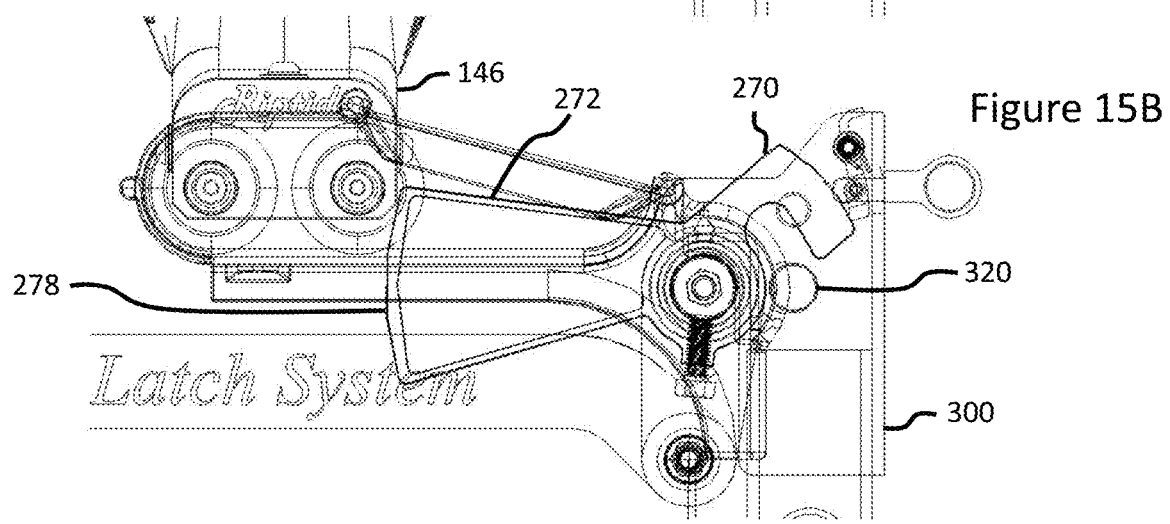
FIG. 15B illustrates the rapid latch system in a position in which the pool cleaning vacuum head remains locked onto the cart, but the cart is unlocked from the transportation rack.
Figure 15C:
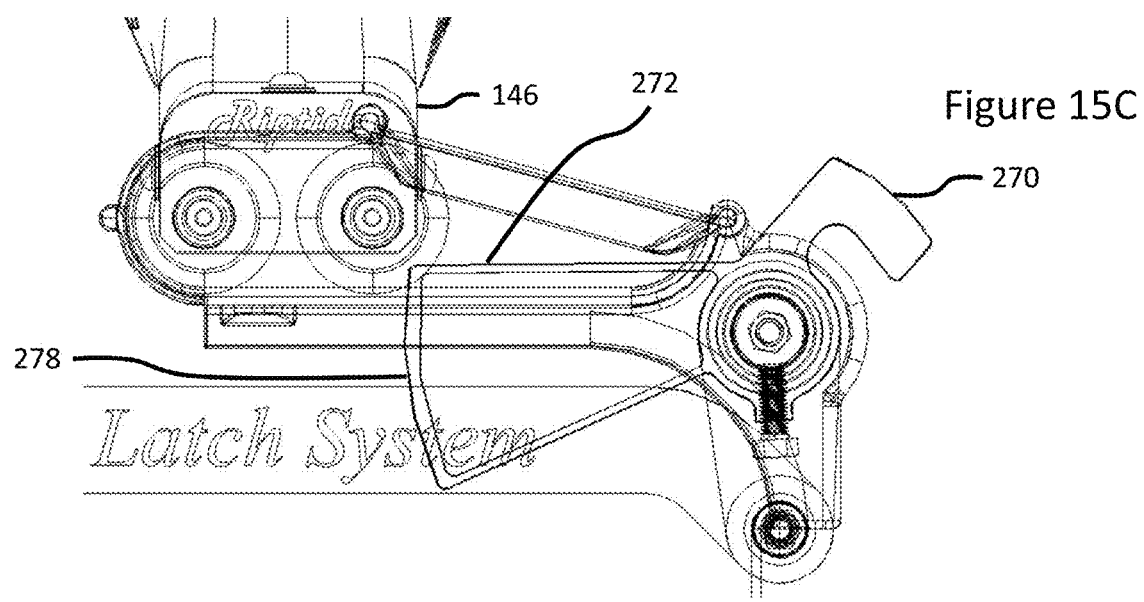
FIG. 15C illustrates the rapid latch system in a position in which the pool cleaning vacuum head is unlocked from the cart.

FIGS. 15A-15C illustrate the results of multiple manipulations of the rapid latch release system 234. FIG. 15A illustrates the rapid latch system 234 in a position in which the pool cleaning vacuum head is locked onto the cart and the cart is locked onto a transportation rack. In this position, handle 240 rests at the first step position 257A, see FIG. 13C. This aligns the vehicle mounting bracket locking component 270 with a portion (bar 320) of the transportation bracket 300. End wall 278 of the pool cleaning vacuum head locking component 272 is in contact with the pool cleaning vacuum head body 148, keeping it secured in place. As the handle 240 is moved to the second stepped position, 257B, see FIG. 13C, the vehicle mounting bracket locking component 270 is rotated off the bar 320. This movement further causes the end wall 278 of the pool cleaning vacuum head locking component 272 to rotate. However, the angle at which the pool cleaning vacuum head locking component 272 is arranged and the length of the end wall maintains contact with the pool cleaning vacuum head body 148. This allows the pool cleaning cart 100 to be unlocked from the transportation bracket while the pool cleaning vacuum head remains locked onto the cart. FIG. 15C illustrates the rapid latch system 234 in a position in which the pool cleaning vacuum head is unlocked from the cart. In this position, handle 240 is moved to the final full release surface 257C. In this position, the pool cleaning vacuum head locking component 272 is further rotated so that end wall 278 is positioned below any portion of the pool cleaning vacuum head body 148. As the pool cleaning vacuum head 146 is released, it rolls toward and rests at wall 230. Since the wall 230 is angled, a portion of the pool cleaning vacuum head 146 can be rotated against the angled wall 230, thereby allowing greater access to the pole connecting member 162.

Figure 16A:
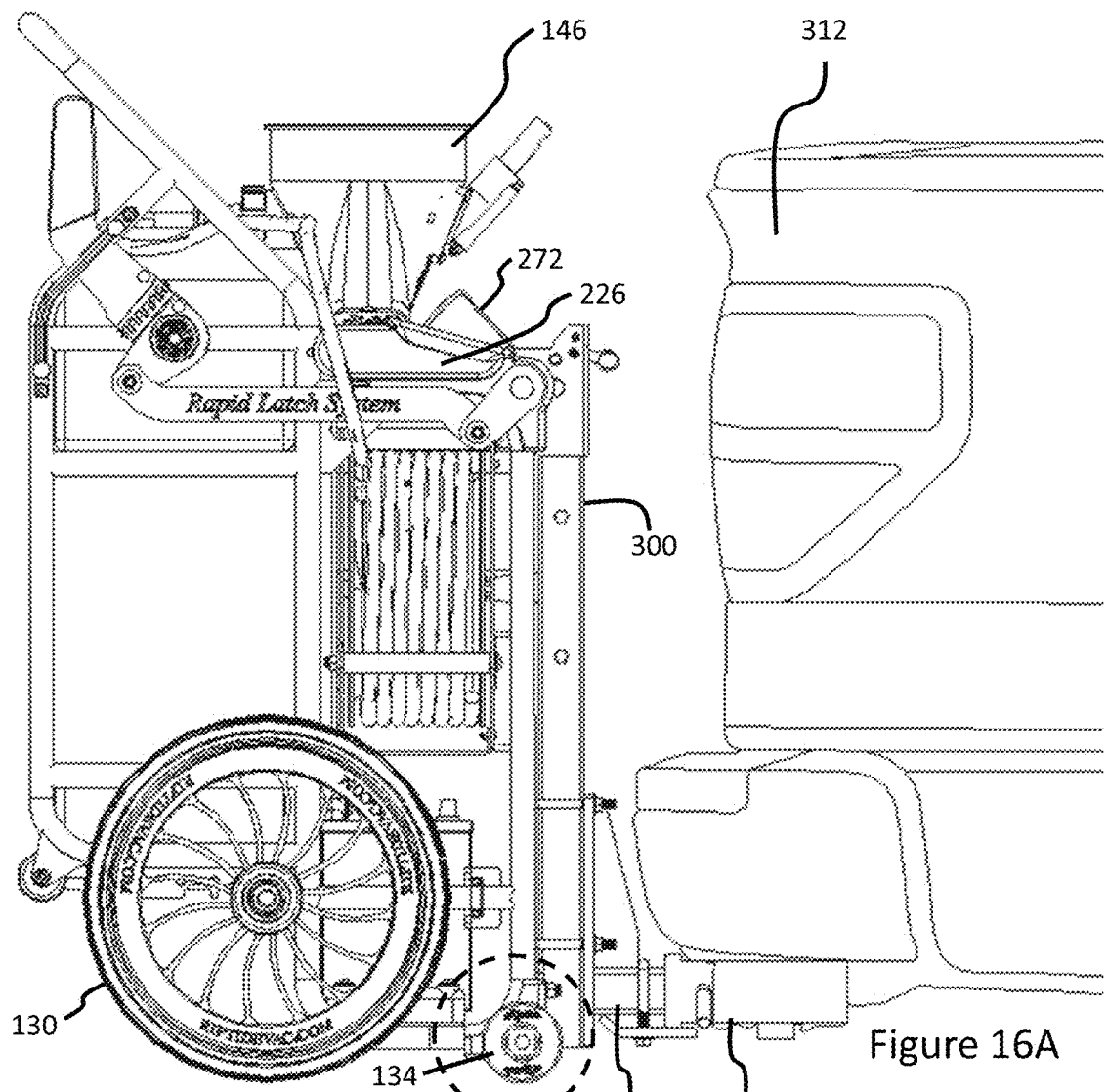
FIG. 16A illustrates the securing of the pool cart to a lower portion of a transportation bracket.
Figure 16B:
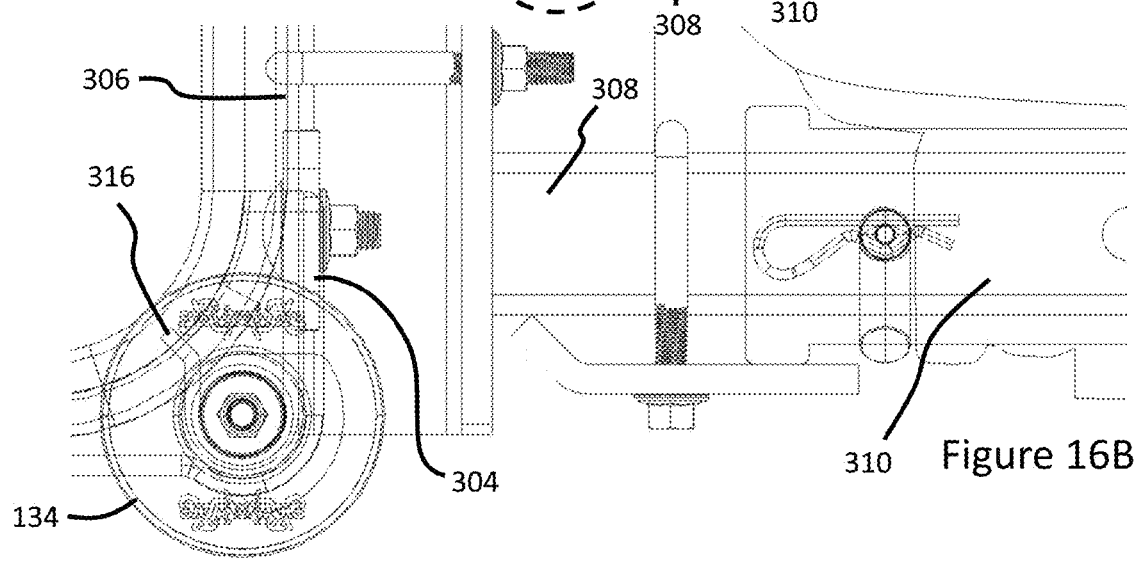
FIG. 16B illustrates a close up view of the connection of the pool cleaning cart and transportation bracket illustrated in the broken line circle shown in FIG. 16A.
Figure 19:
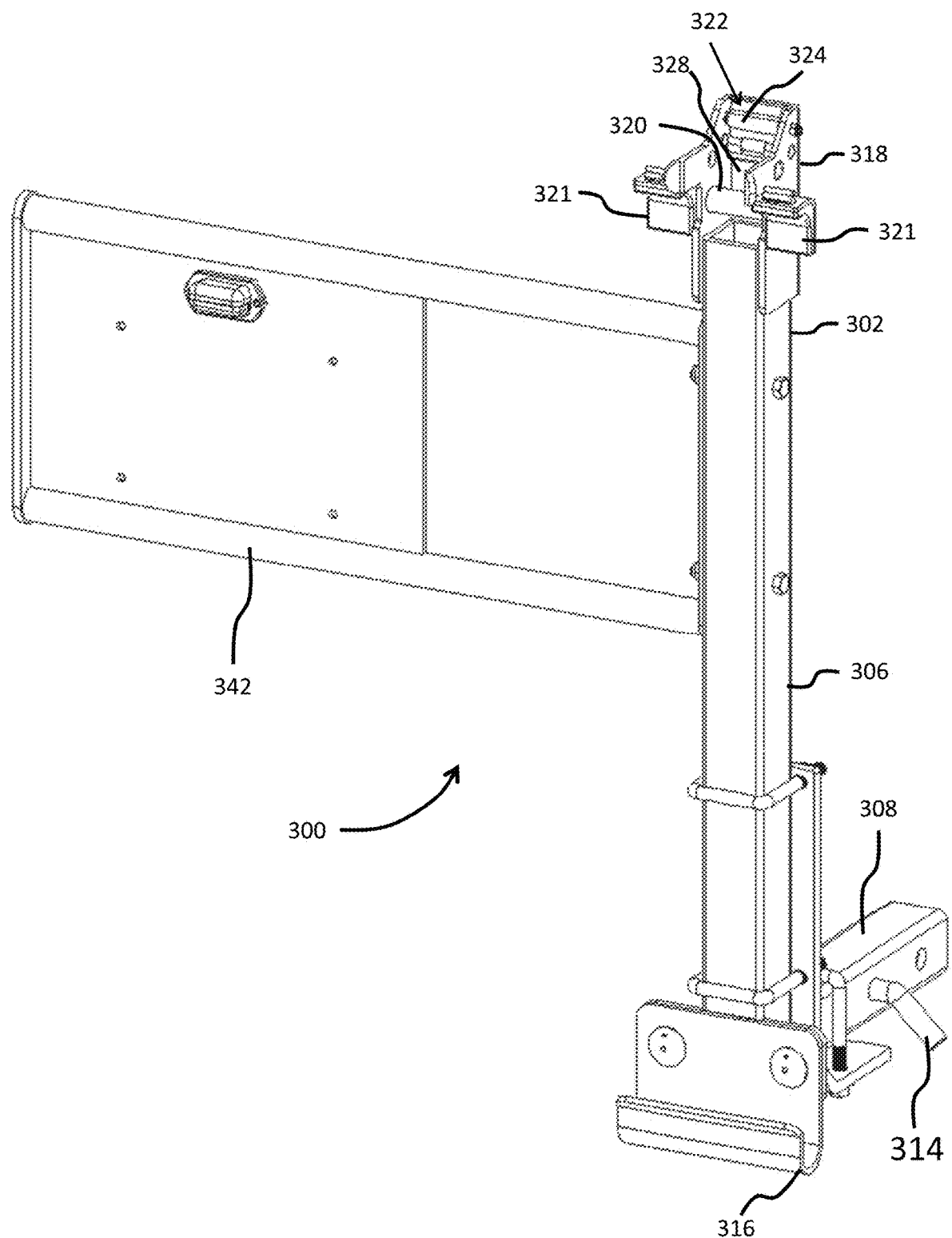
FIG. 19 is a front side perspective view of an illustrative transportation bracket.
Figure 20:
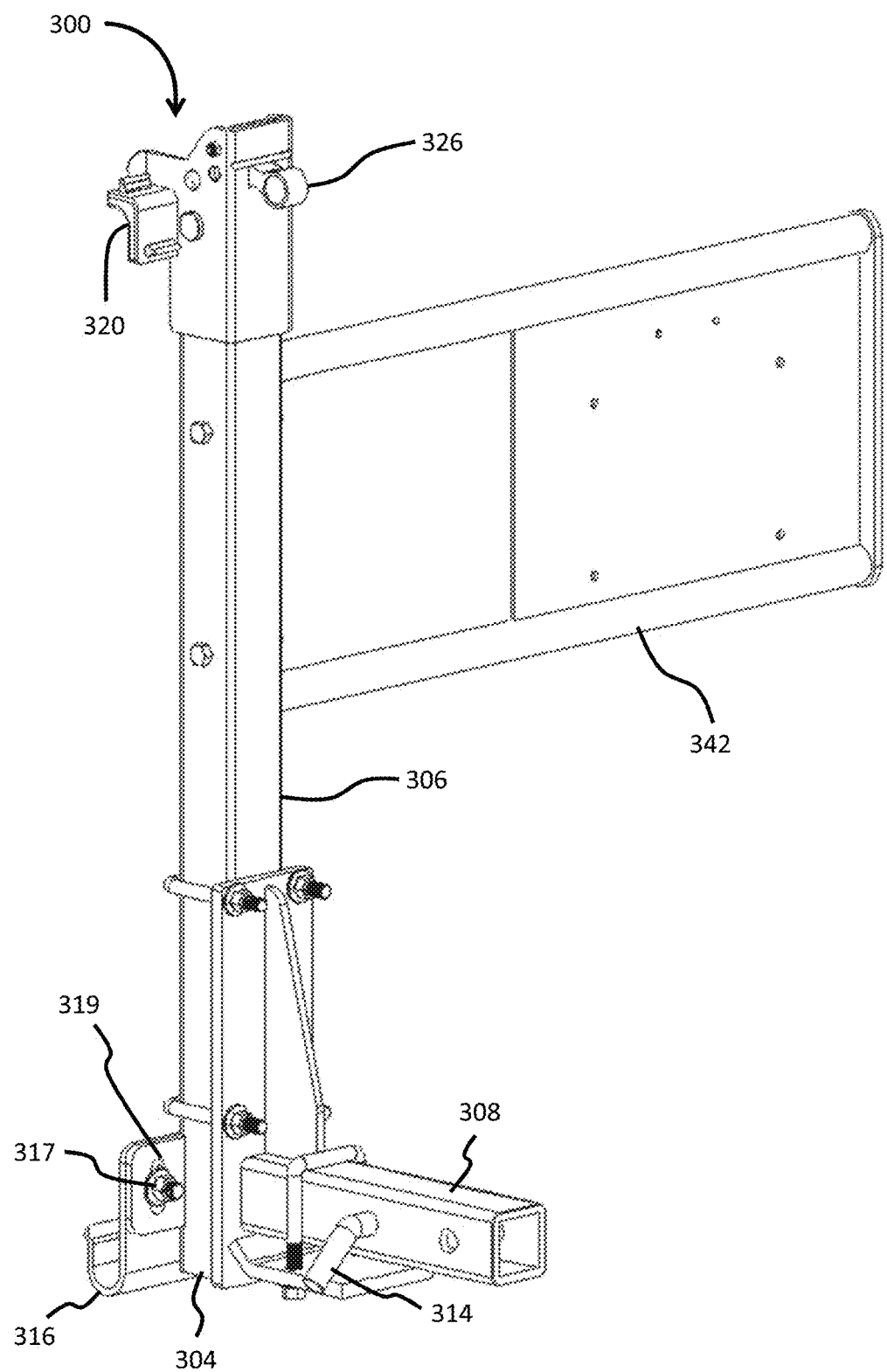
FIG. 20 is a back side perspective view of the transportation bracket.

The transportation bracket 300, see FIGS. 1, 19, and 20, allows a user to secure the pool cleaning cart 100 to a vehicle for transporting to various locations. The transportation bracket 300 comprises a first end 302, a second end 304, and a main body 306 therebetween. The second end 304 comprises a hitch tongue 308 which slides into a tow vehicle receiver 310 on a moving vehicle, such as truck 312, see FIGS. 16A and 16B, and is secured for towing by a pin 314. The second end 304 also contains a bracket, illustrated herein as a J-shaped catch 316, sized and shaped to receive and hold a bottom portion or bar member of the frame 102. The J-shaped catch 316 is adjustable by securing screw 317 within a slotted opening 319. Located at the first end 302 is a locking component receiving member 318 sized and shaped to receive, for example, at least a portion of the U-shaped hooked vehicle mounting bracket locking component 270, see FIG. 17. The locking component receiving member 318 contains a bar 320 sized and shaped to receive and secure with the U-shaped hooked vehicle mounting bracket locking component 270. The locking component receiving member 318 may also contain a plurality of pads 321 sized to engage with the pool cleaning vacuum head locking assembly elongated body 258, see 13A. A safety latch 322 comprising a spring-loaded plate 324 and release pin 326 prevents accidental release. In the locked position, the spring-loaded plate 324 extends out from the back wall 328, see also FIG. 15A, and aligns just above the U-shaped hooked vehicle mounting bracket locking component 270 when inserted therein. In the unlocked position, a portion of the spring-loaded plate 324 is at or near the back wall, see FIG. 15B, allowing the U-shaped hooked vehicle mounting bracket locking component 270 to pass without contact. The transportation bracket 300 may also contain a license plate bracket 342 sized and shaped to secure a vehicle license plate.

FIGS. 21-24 illustrate the pool cleaning cart 100 shown with an alternative embodiment of a vacuum head coupling mechanism. The pool cleaning cart 100 contains any one of, or combinations of, the features or components as described above, with several additional features. Attached to the frame 102 is a vacuum head securing member 275 (two located on opposite sides of the frame 102). The vacuum head securing member 275 replaces the use of the rapid latch system 234 and the pool vacuum cleaning head cradle 222A/222B components. The vacuum head securing member 275 comprises an elongated body 277 extending outwardly and away from the frame 102. The vacuum head securing member elongated body 277 further comprises one or more vacuum head engaging members, illustrated herein as a plurality of ring like structures 279 which extend outward from the vacuum head securing member elongated body 277 and are sized and shaped to engage with and secure at least a portion of a vacuum head thereto.

Figure 21:
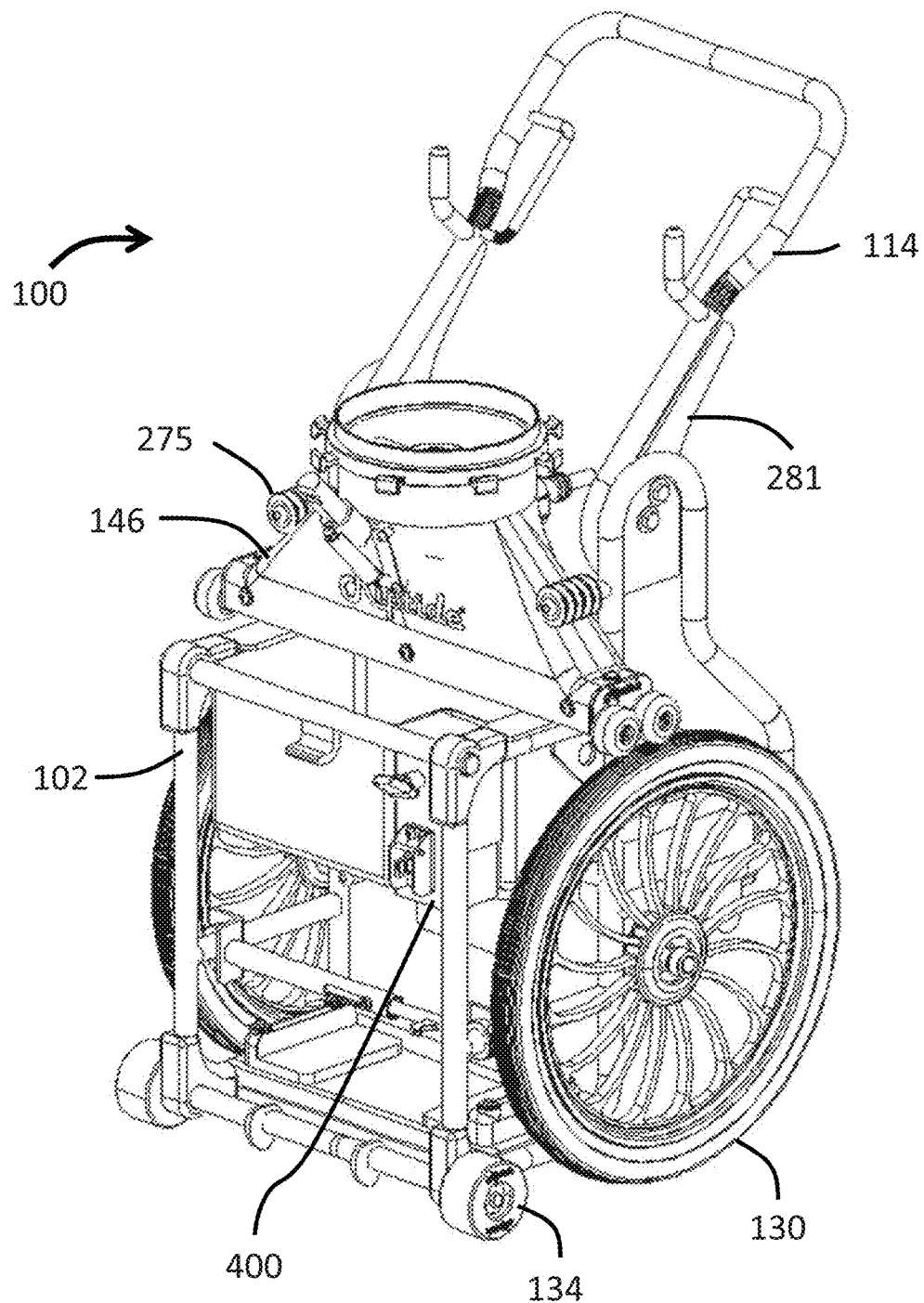
FIG. 21 is a perspective view of the pool cleaning cart shown with an alternative embodiment of a vacuum head coupling mechanism.
Figure 22:
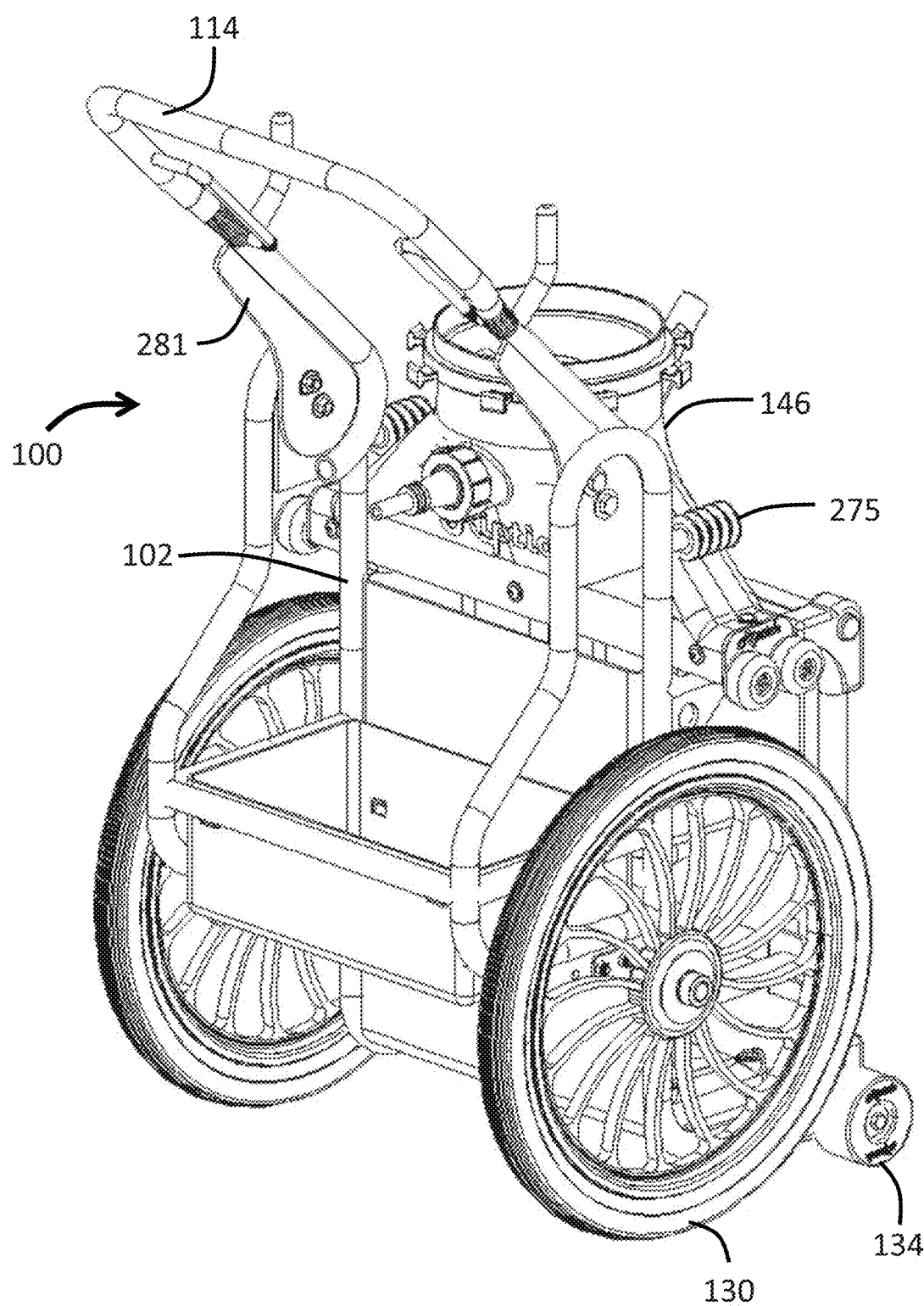
FIG. 22 is an alternative perspective view of the pool cleaning cart illustrated in FIG. 21, shown without an attached pool vacuum head.
Figure 23:
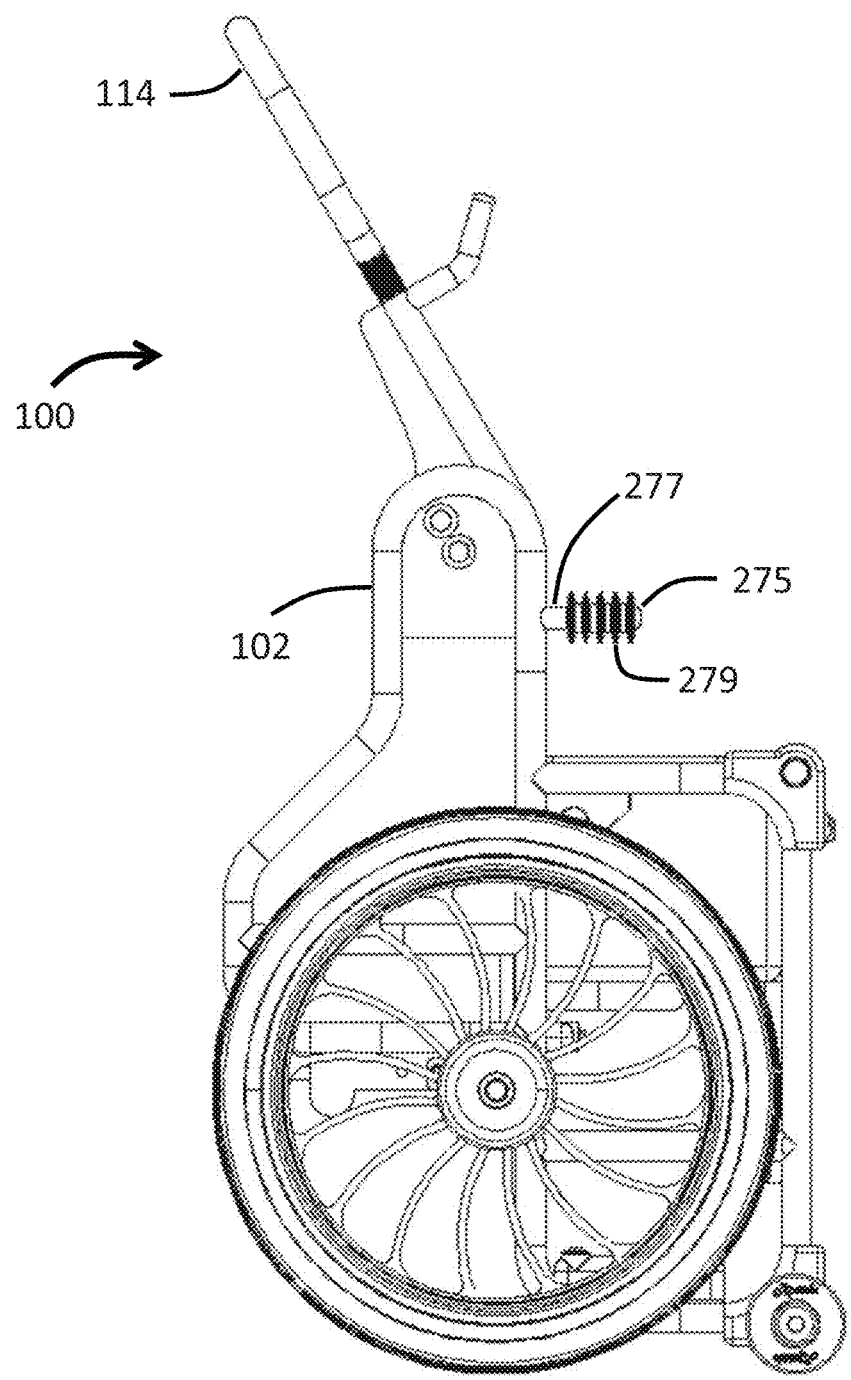
FIG. 23 is a side view of the pool cleaning cart illustrated in FIG. 21, shown without an attached pool vacuum head.
Figure 24:
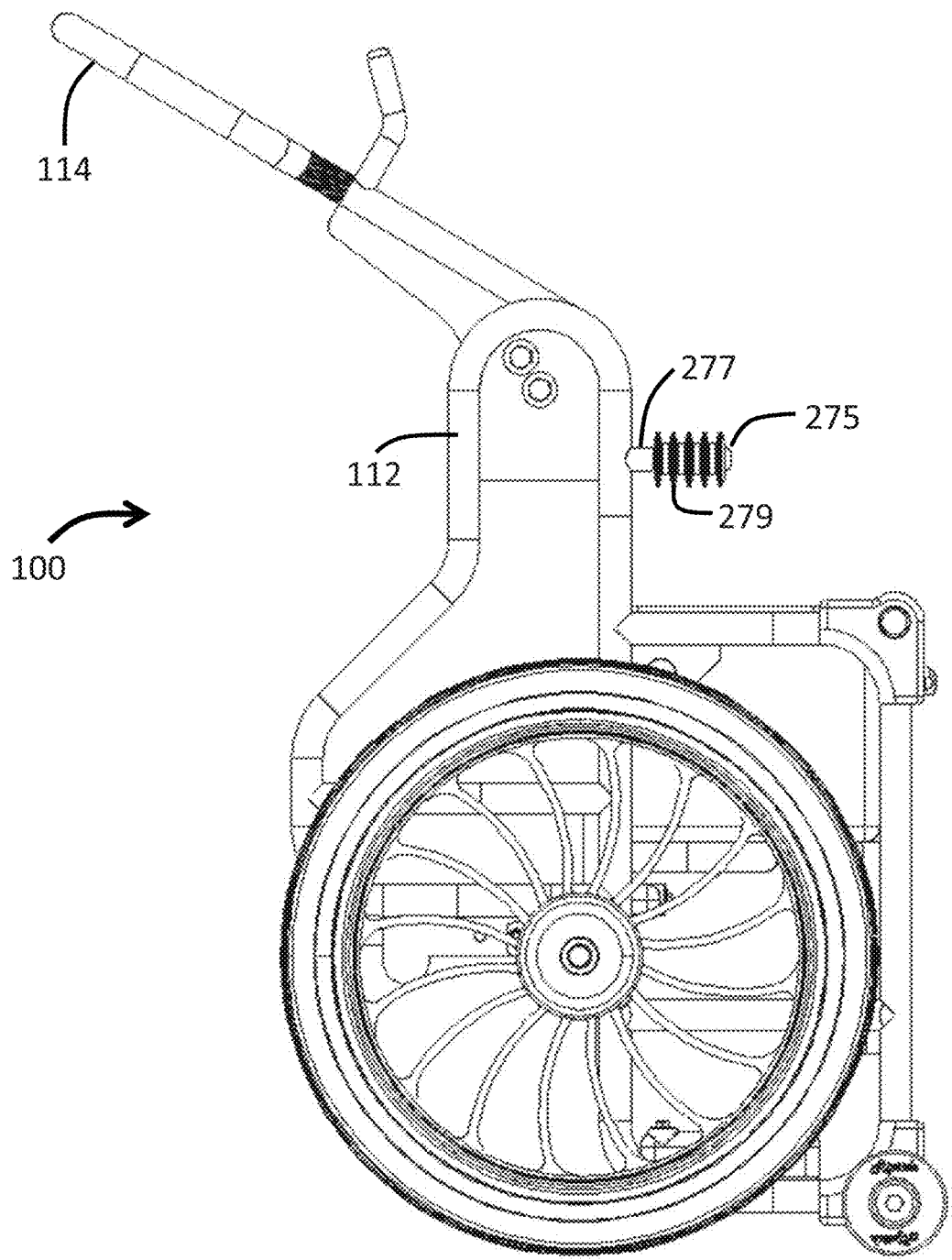
FIG. 24 illustrates the pool cleaning cart illustrated in FIG. 21 with an adjustable handle shown in an adjusted position.
Figure 25:
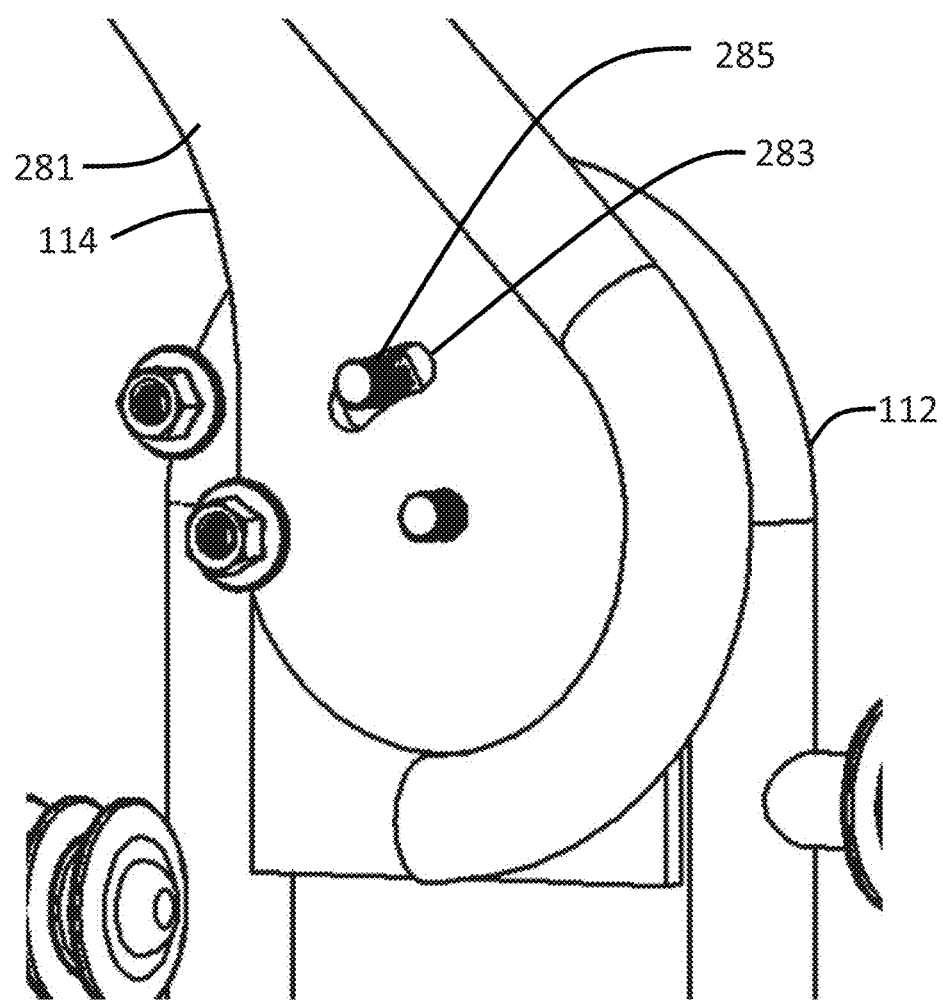
FIG. 25 illustrates a close-up view of the adjustable handle attachment to the pool cleaning cart frame.
Figure 26:
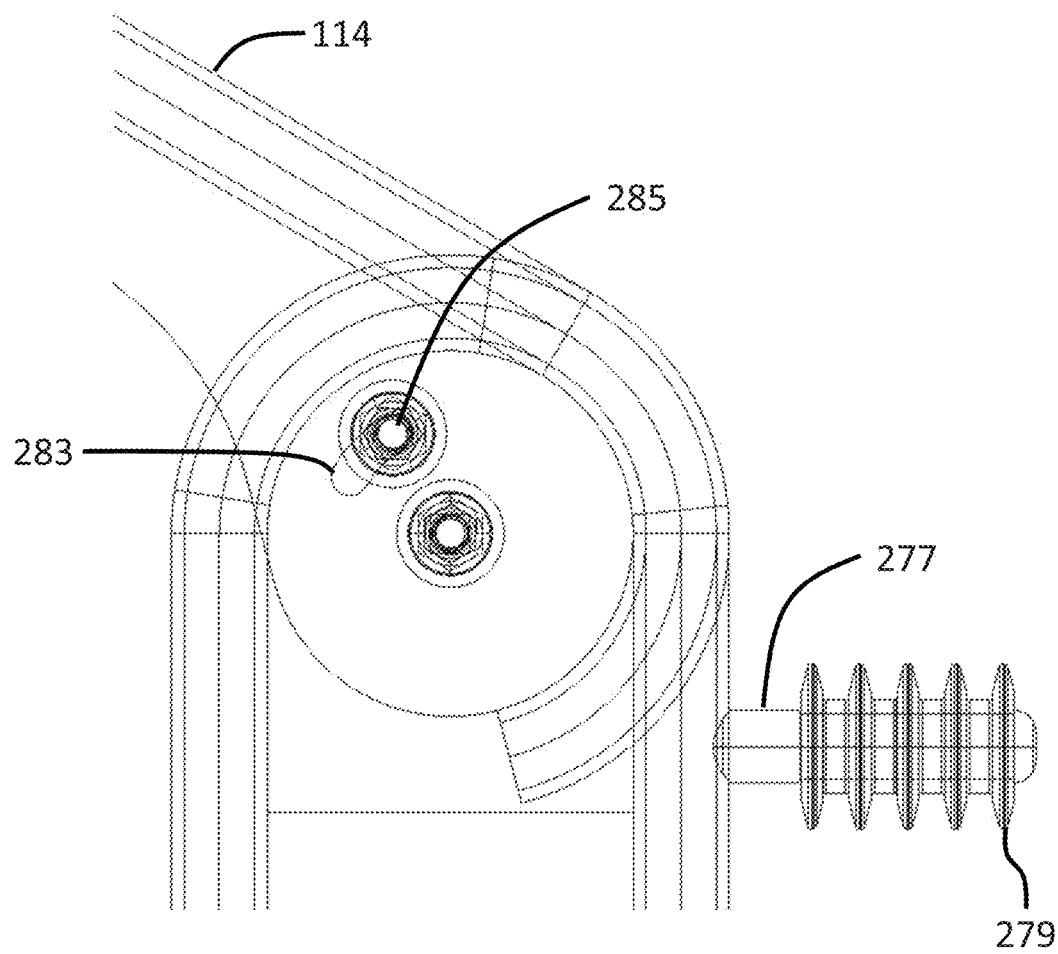
FIG. 26 illustrates the adjustable handle shown in an adjusted position.

The cart 100 is also configured to have an adjustable horizontal handle bar 114. The adjustable horizontal handle bar 114 comprises plate 281 having a slotted opening 283 sized and shaped to receive a securing screw 285, see FIG. 25. Placing the screw 285 into any portion of the slotted opening 283 allows the handle bar 114 to assume various positions. FIG. 25 illustrates the screw 285 secured in a central portion of the slotted opening 283, positioning handle bar 114 in a first position, as shown in FIG. 21. FIG. 26 illustrates the screw 285 secured at one end of (far right end) the slotted opening 283, positioning handle bar 114 in a second, adjusted position as shown in FIG. 22. The adjustable horizontal handle bar 114 allows the cart 100 to be adjusted based on a user's height, or based on a weight distribution required.

Figure 27:
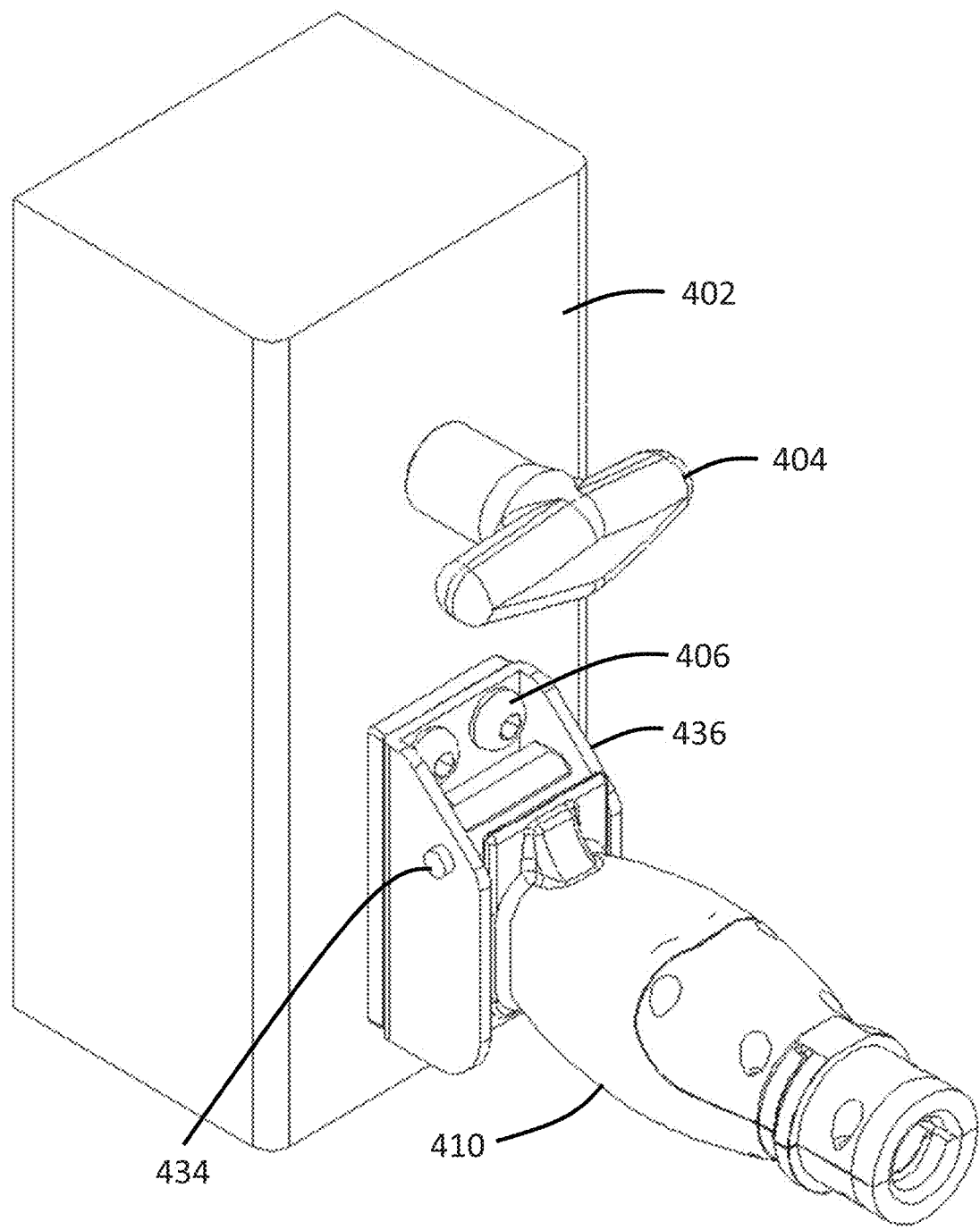
FIG. 27 is a perspective view of an illustrative example of a power cord connection assembly unit.
Figure 28:
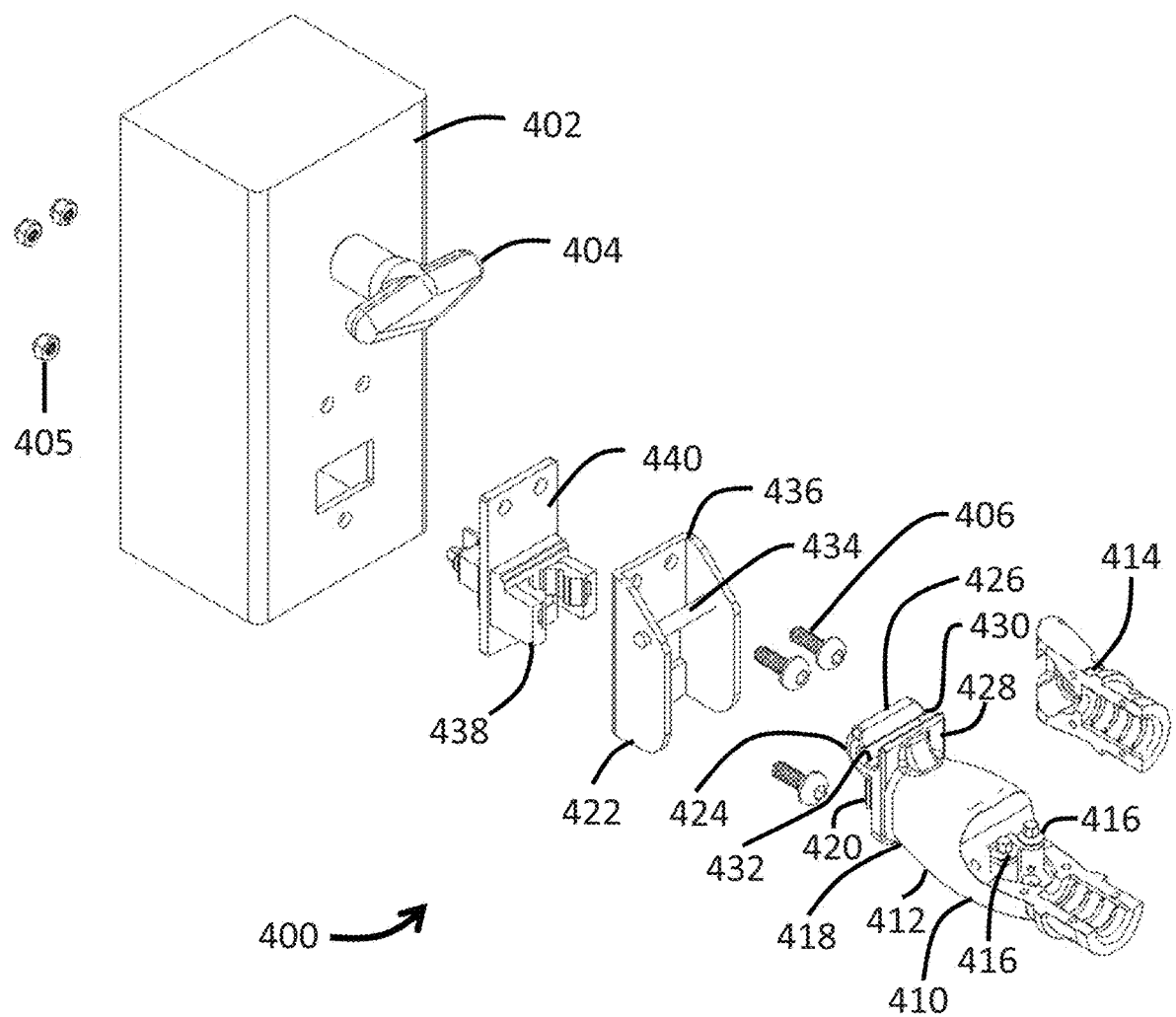
FIG. 28 is an exploded view of the power cord connection assembly unit.
Figure 29A:
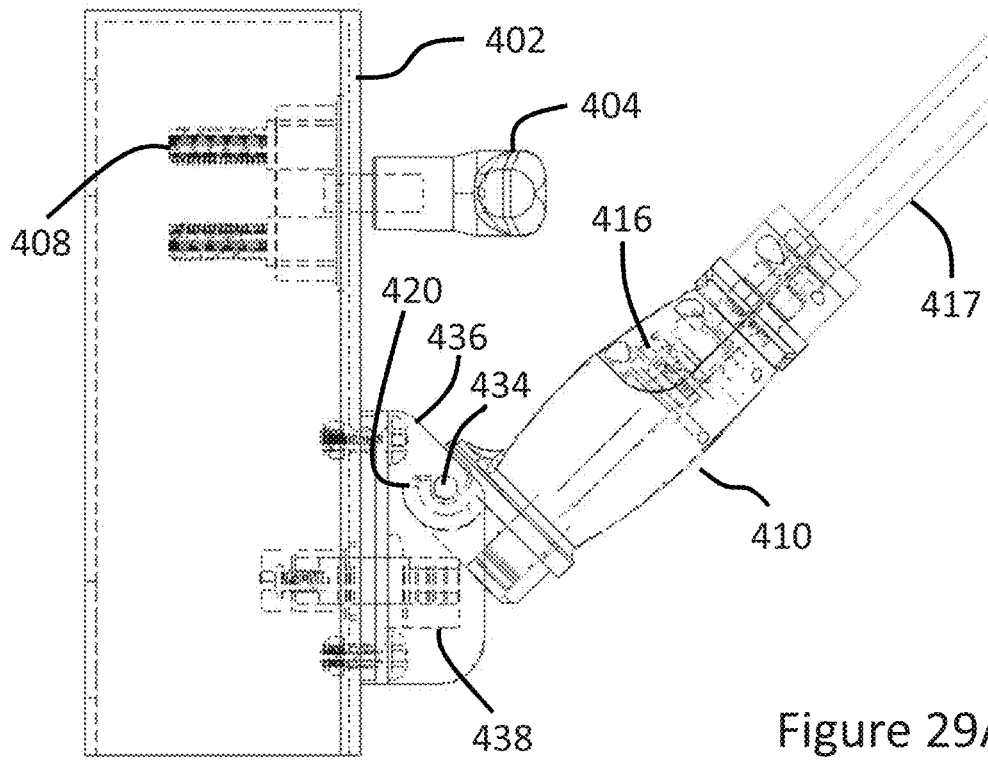
FIG. 29A illustrates insertion of the power cord into the power cord connection assembly unit.
Figure 29B:
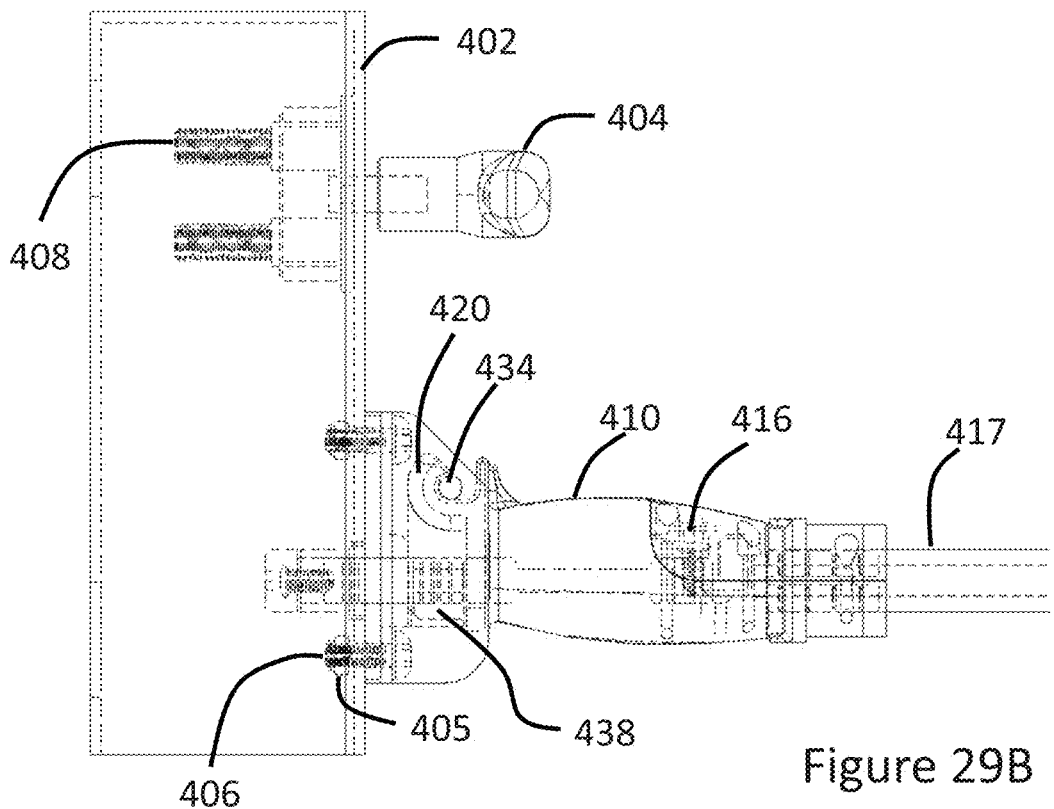
FIG. 29B illustrates the securing of an electric connection of a power cord with the power cord connection assembly unit.

FIGS. 27-29 illustrate an illustrative example of a power cord connection assembly unit 400, which can be secured to a portion of the frame 102 (see FIG. 21). The power cord connection assembly unit 400 comprises a support structure 402 having a handle 404. The support structure 402 and other components may be held in place through the use of securing members, illustrated herein as screws 406 and nuts 408. A power cord plug end 410, having a first portion 412 and a removeable second portion 414, contains electrical contacts 416 for receiving wires from a power cord 417. The back end 418 of the power cord plug end 410 comprises a power cord plug securing component 420 sized and shaped to engage with and secure to a power cord plug securing component 422.

The power cord plug securing component 420 is shown having a generally U-shaped body 424 defined by two side walls 426 and 428, separated by a gap or space 430. The inner surface 432 formed by the gap 430 is sized and shaped to engage with and secure to, i.e. hook to, a pin 434 secured to a power cord plug securing component bracket 436. In use, the power cord plug end 410 hooks onto the pin 434. As the power cord plug end 410 is pushed down, it snaps electrical contacts 438, secured to a support plate 440, with the centrical contacts in the power cord plug end 410 together. Such features allow the user to create sufficient leverage to enable connections to be made.

Figure 30:
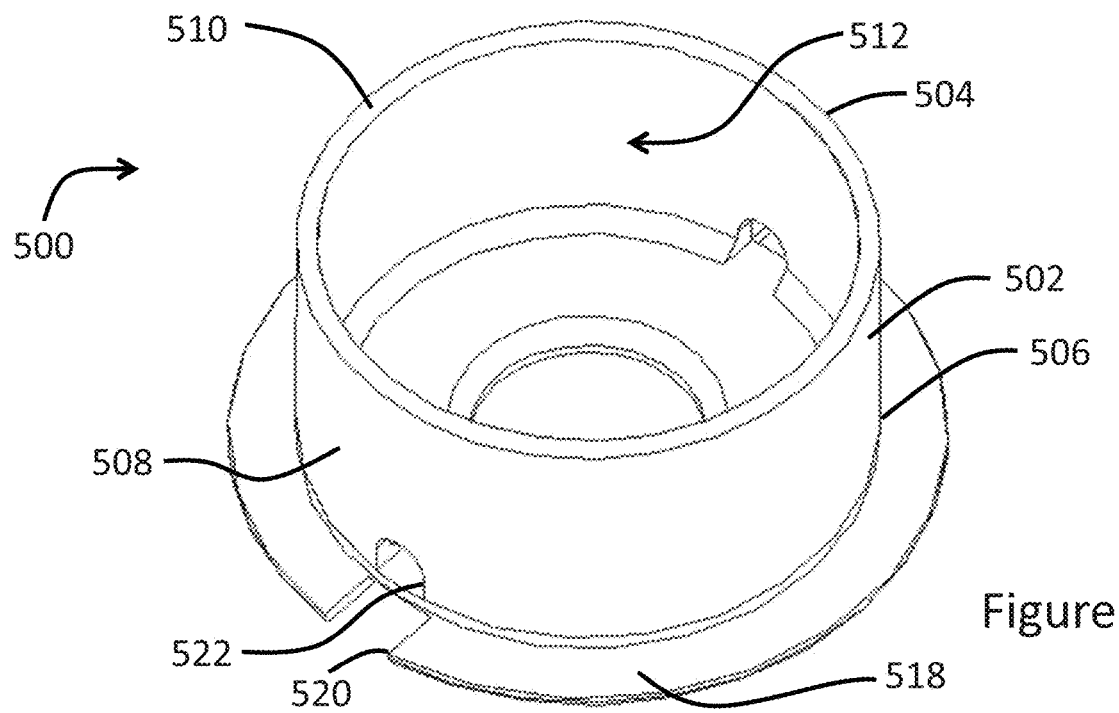
FIG. 30 is a top perspective view of an illustrative example of a debris block designed to protect a motor from debris, such as hair or other objects, wrapping around the motor shaft.
Figure 31:
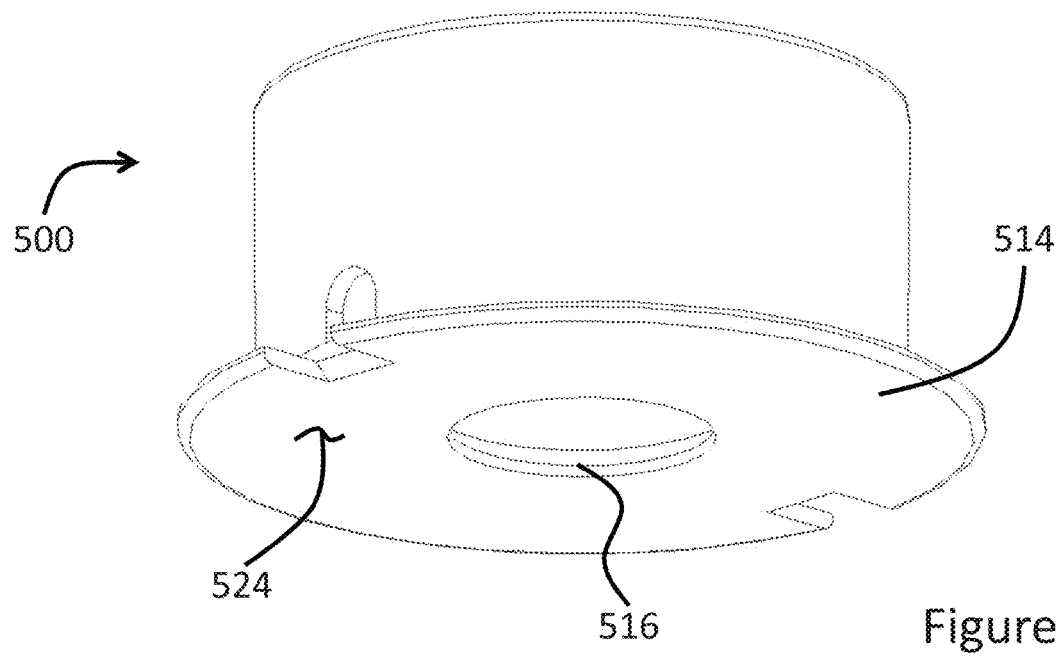
FIG. 31 is a bottom perspective view of the debris block illustrated in FIG. 30.

Referring to FIGS. 30 and 31, an illustrative motor debris block 500 is illustrated. The motor debris block 500 is designed to protect a motor from debris, such as hair or other objects, wrapping around the motor shaft, thereby creating resistance on the motor or causing damage to the shaft or shaft seal. Such damage tends to shorten the motor life, and prevention of debris from access to the motor will dramatically increase motor efficiency and lifespan. The motor debris block 500 comprises a main body 502 having an upper end 504 and a lower end 506. The main body 502 is illustrated as having a continuous blocking wall 508, thereby having a generally circular or tubular shape. The upper end 504 comprises an opening 510, exposing the interior portion 512. The lower end 506 is partially closed by a bottom wall 514. The bottom wall 514 comprises a central aperture 516 sized and shaped to fit over a motor shaft. Extending from the lower end 506 is a flanged ring 518, extending around the perimeter of the blocking wall 508. Cutouts 520 provide a mechanism for a user to easily remove the motor debris block 500 when in place. Openings 522 provide a mechanism for liquid drainage. The outer surface 524 of the bottom wall 514 is preferably flat.

Figure 32:
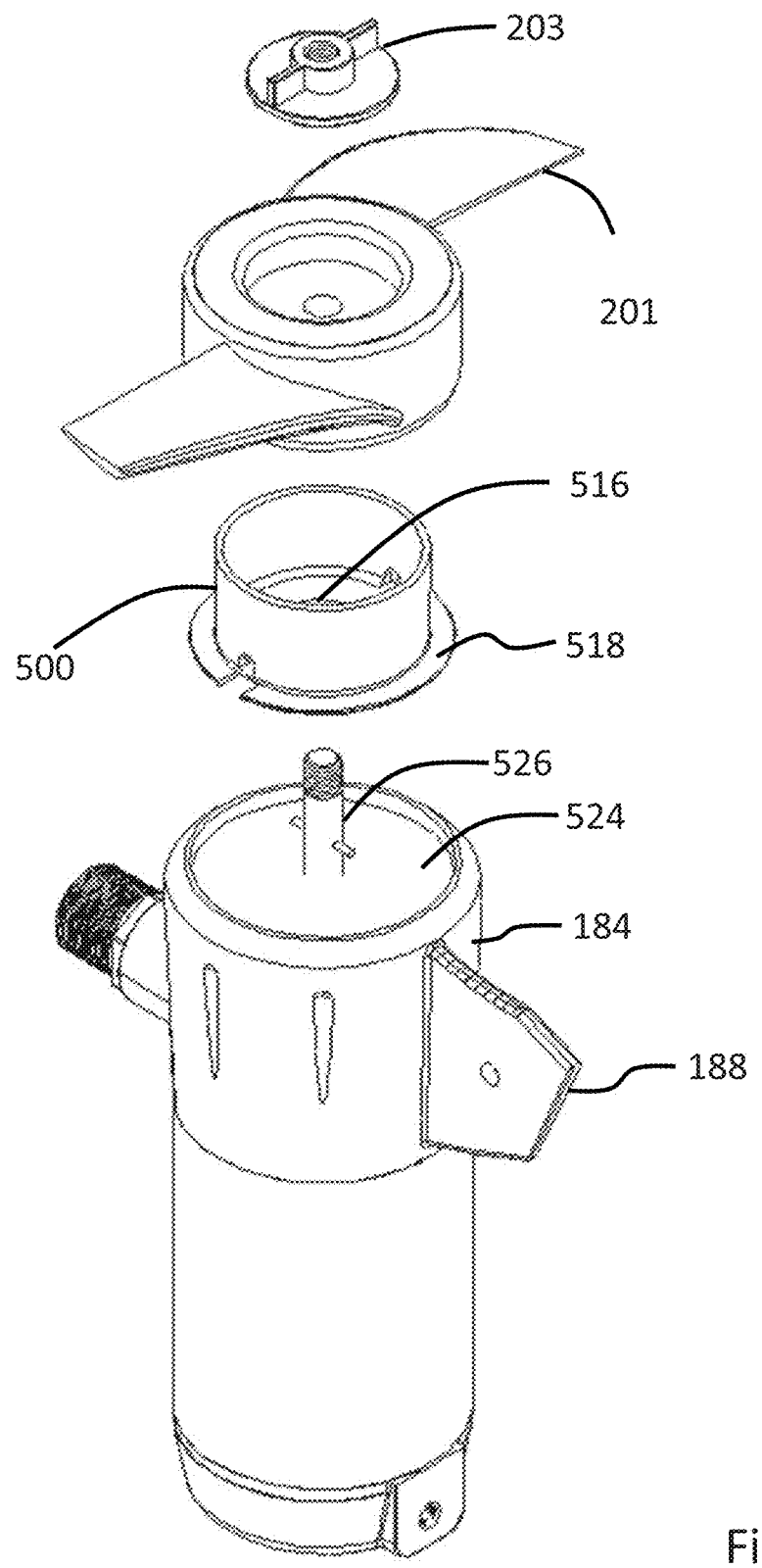
FIG. 32 is an exploded view of a trolling motor with the debris block.
Figure 33:
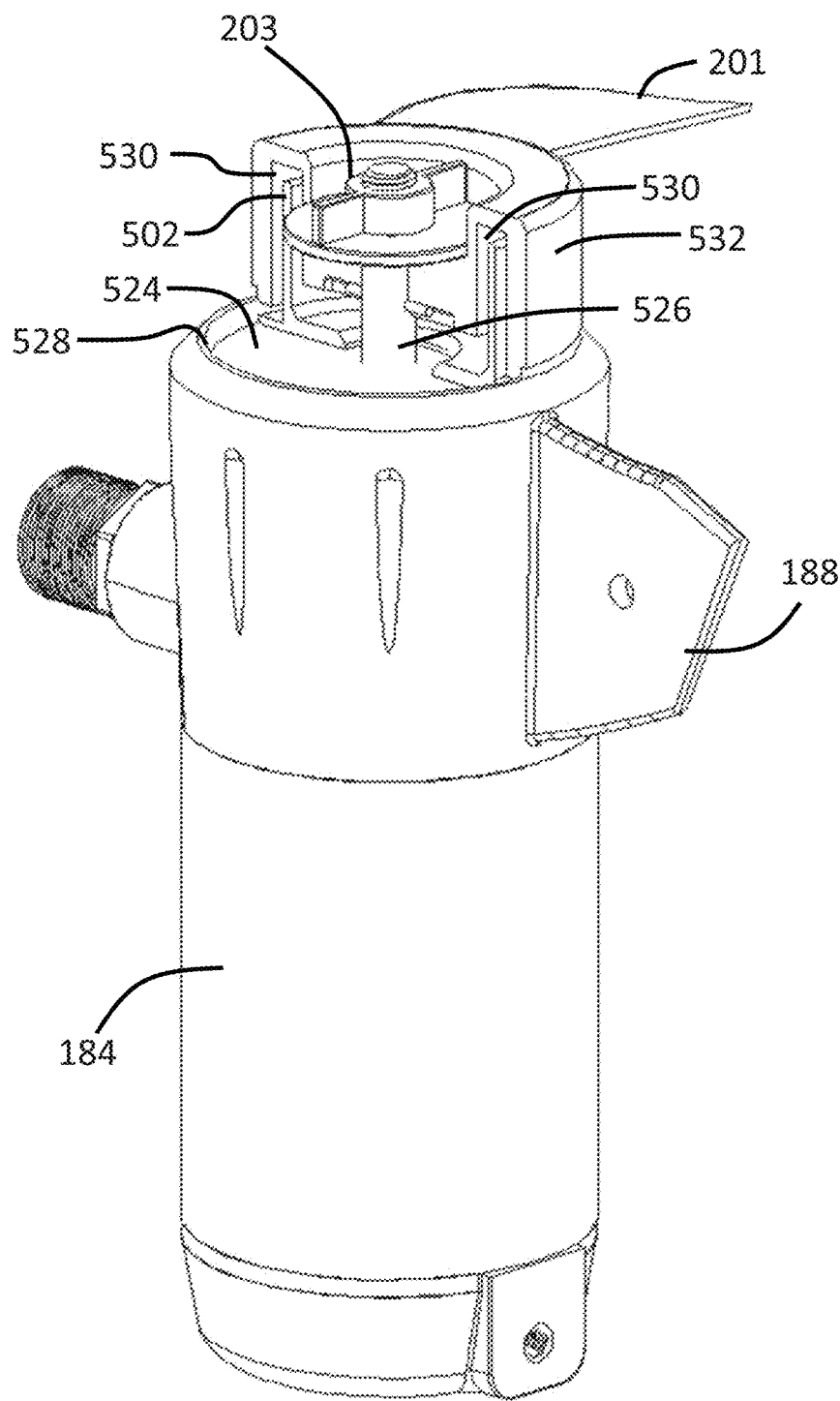
FIG. 33 is a perspective view of the trolling motor with the debris block, with the blade and debris block shown in cross section.
Figure 34:
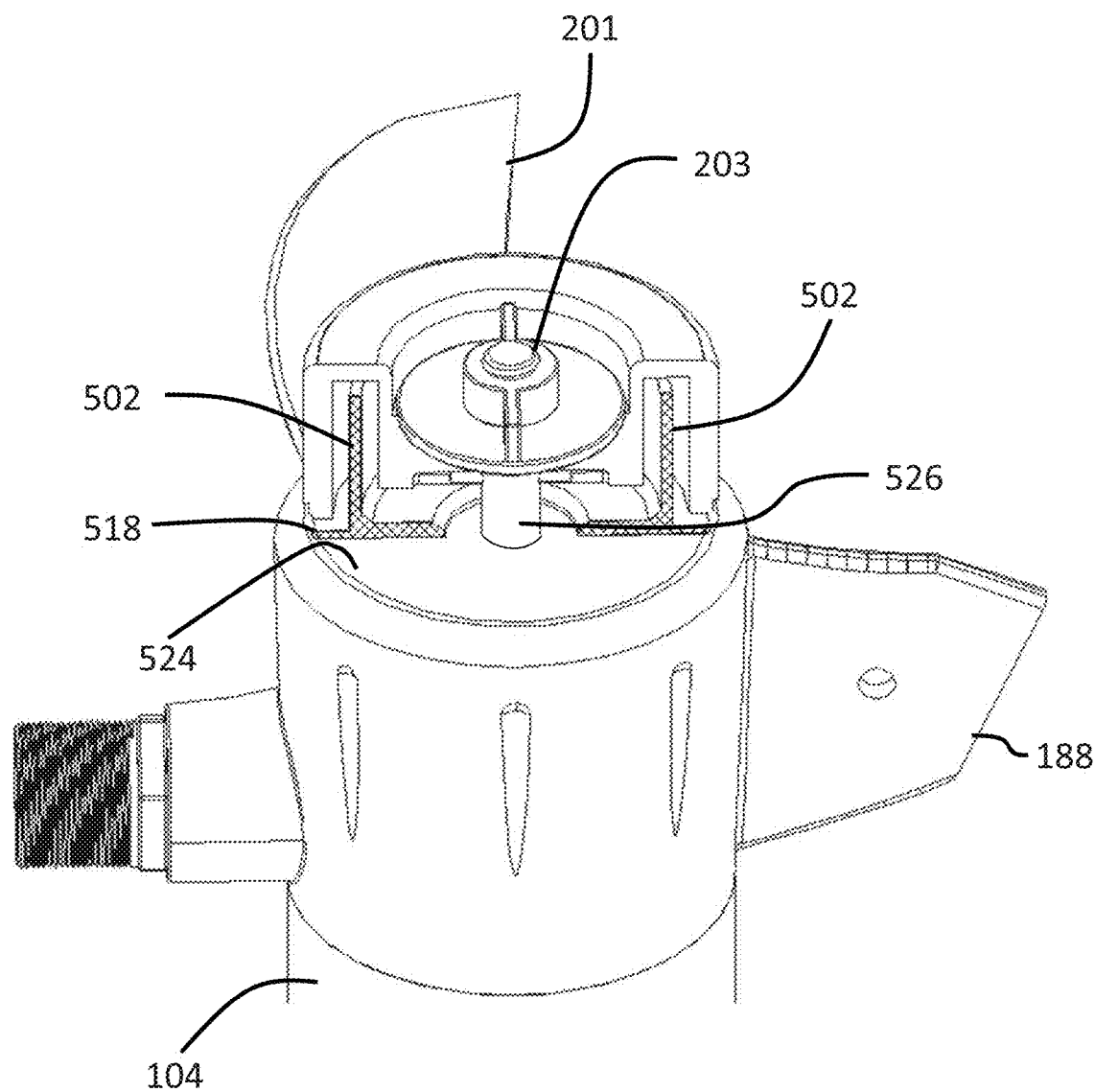
FIG. 34 is a partial view of the trolling motor with debris block, with the blade and debris block shown in cross section.

FIG. 32 illustrates an exploded view of the of the motor debris block 500 assembly, including the trolling motor 184 with blades 201 and wingnut 203. The motor debris block 500 is designed to fit on top of the trolling motor upper surface 524, with the shaft 526 positioned within opening 516. As shown in FIGS. 33 and 34, the flanged ring 518 is designed to rest against a raised surface 528 of the trolling motor 184. This positions the motor debris block blocking wall 508 to extend within an interior 530 of the blade or propeller/impeller support structure 532, thereby preventing debris from accessing the motor or wrapping around the shaft 526 should it enter in between any space between the blade support structure 532 and the raised surface 528. While the motor debris block 500 is shown as an independent unit that can be added to an existing motor, it may be configured to be molded into or integrally formed to the motor. While the type of motor described herein is a trolling motor, other motors may be used as well.

Figure 35:
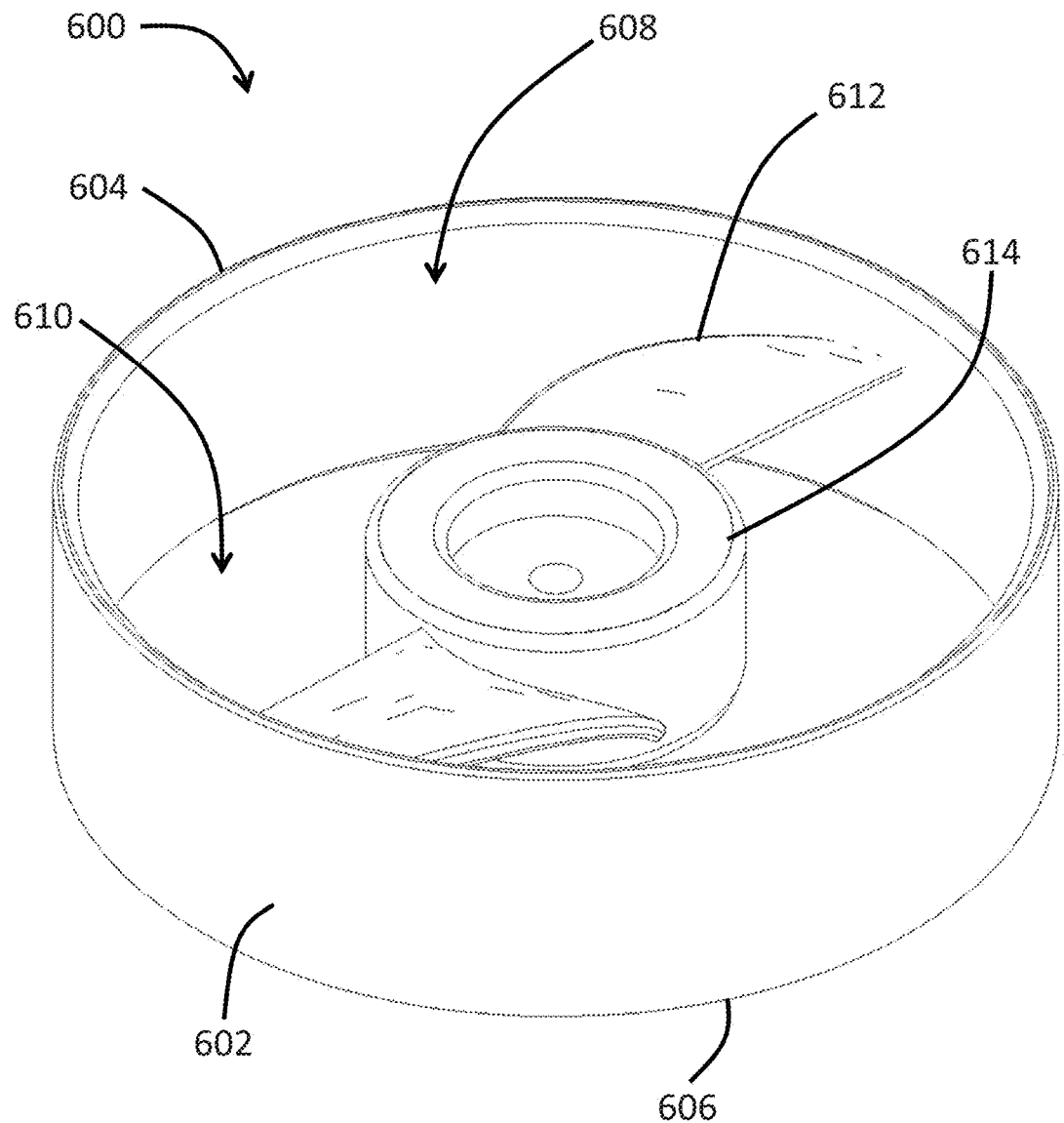
FIG. 35 is a perspective view of an illustrative embodiment of a hard debris barrier configured to secure to a motor blade/propeller/impeller and prevent hard objects, such as rocks, acorns or small, hard children's toys, from being flung out by a motor blade/propeller/impeller.
Figure 36:
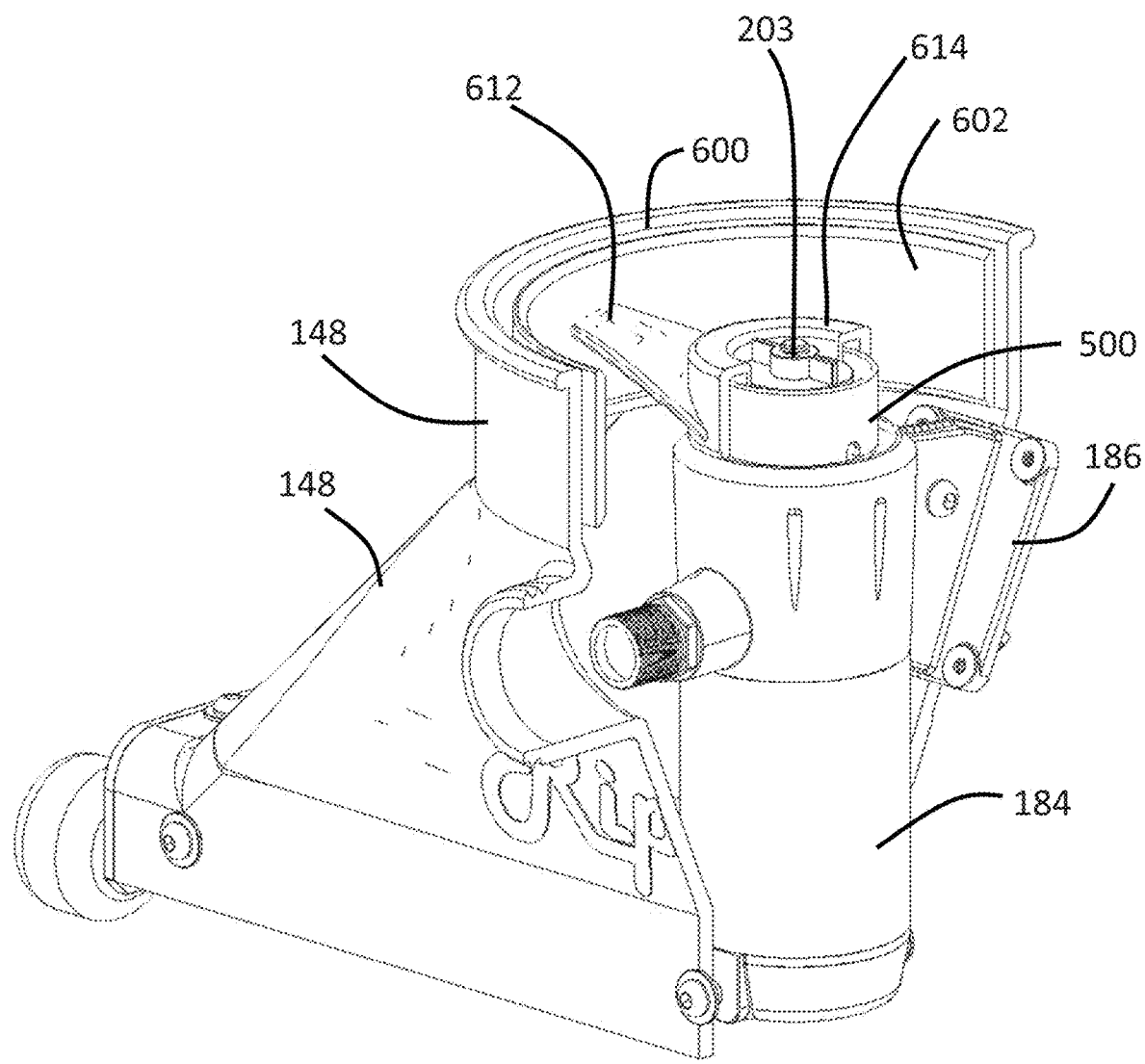
FIG. 36 is partial perspective view of the pool cleaning vacuum head, illustrating the trolling motor with the hard debris barrier.

FIG. 35 illustrates an embodiment of a hard debris barrier 600 designed to secure to a motor blade/propeller/impeller and prevent hard objects, such as rocks, acorns or small, hard children's toys, such as metal toy cars, from being flung out by the blade/propeller/impeller. Preventing debris from being flung prevents hard debris from wedging between the blade/propeller/impeller and the vacuum case, thereby stopping the motor and potentially causing damage to the motor. The hard debris barrier 600 comprises a continuous wall 602 forming a circular profile having a top end 604 and a bottom end 606; each end 604 and 606 having an opening 608 and 610. A blade/propeller/impeller 612, is secured to a blade/propeller/impeller support structure 614 at one end and to the continuous wall 602 at an opposing end. The attachment of the blade/propeller/impeller 612 to continuous wall 602 may be at an angle. Accordingly, as the blade/propeller/impeller 612 rotates, the continuous wall 602 rotates. The blade/propeller/impeller support structure 612 may be designed in the same manner as the blade support structure 532, thereby allowing it to engage with the motor debris block 500, see FIG. 36.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary, and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A pool cleaning vacuum head comprising:
   a vacuum head outer housing unit having an interior region configured to hold one or more functional components therein, said one or more functional components comprising at least a vacuum producing assembly configured to remove materials or debris from a surface; and
   a materials collection unit removably secured to said vacuum head outer housing unit, said materials collection unit configured to collect debris and other material retrieved from a vacuumed surface comprising a bag configured for collecting said debris and other materials, said bag having a ring structure configured to snap fit to at least a portion of said vacuum head outer housing unit.

2. The pool cleaning vacuum head according to claim 1 further including a pole connecting member assembly configured to connect to a pole.

3. A pool cleaning vacuum head according to claim 2, wherein said pole connecting member assembly comprises a pole connecting member having an elongated body extending away from said vacuum head outer housing unit, said elongated body having a channel cut through a surface to provide two opposing, overhang attaching surfaces.

4. The pool cleaning vacuum head according to claim 3, further including a pole coupler having a catch and snap release mechanism, said pole coupler configured to engage and secure to said pole connecting member at one end and to a pole at a second, opposing end.

5. The pool cleaning vacuum head according to claim 1, further including a threaded member having an opening extending into said interior region, said opening sized and shaped to allow one or more portions of an electrical connection assembly to pass through said vacuum head outer housing unit and attach to at least one component of said vacuum producing assembly.

6. The pool cleaning vacuum head according to claim 1, wherein said bag is a mesh bag.

7. The pool cleaning vacuum head according to claim 1, wherein said ring includes at least one gripping body arranged around a perimeter of said ring and extending away from said ring, said gripping body sized and shaped to allow a user to easily attach or remove said ring from said vacuum head outer housing unit.

8. The pool cleaning vacuum head according to claim 1, further including two sets of double outboard wheels, said outboard wheels sized to extend out past said vacuum head outer housing unit.

9. The pool cleaning vacuum head according to claim 8 wherein said outboard wheels are attached to an end plate.

10. The pool cleaning vacuum head according to claim 1 wherein said vacuum head outer housing unit is a single piece.

11. The pool cleaning vacuum head according to claim 1 further including a cord removably attached to a motor.

12. The pool cleaning vacuum head according to claim 1, further including a motor having a debris block configured to prevent damage to said motor from said debris or other materials.

13. The pool cleaning vacuum head according to claim 12, wherein said pool vacuum head comprises a ridge.

14. The pool cleaning vacuum head according to claim 1, wherein said vacuum head outer housing unit comprises a power cord connection assembly unit configured to snap fit a power cord plug end.

15. The pool cleaning vacuum head according to claim 14, wherein said power cord connection assembly unit comprises a cord plug securing component having a generally U-shaped body defined by two side walls, separated by a gap.

16. A pool cleaning vacuum head comprising:
- a vacuum head outer housing unit having an interior region configured to hold one or more functional components therein and a threaded member having an opening extending into said interior region, said one or more functional components comprising at least a vacuum producing assembly configured to produce a vacuum with sufficient force to remove materials or debris from a surface, said threaded member opening sized and shaped to allow one or more portions of an electrical connection assembly to pass through said vacuum head outer housing unit and attach to at least one component of said vacuum producing assembly; and
- a materials collection unit removably secured to said vacuum head outer housing unit, said materials collection unit configured to collect debris and other material retrieved from a vacuumed surface.

17. A pool cleaning vacuum head comprising:
- a vacuum head outer housing unit having an interior region configured to hold one or more functional components therein, said one or more functional components comprising at least a vacuum producing assembly configured to remove materials or debris from a surface;
- a pole connecting member assembly configured to connect with a pole, said pole connecting member assembly comprising a pole connecting member having an elongated body extending away from said vacuum head outer housing unit, said elongated body having a channel cut through a surface to provide two opposing, overhang attaching surfaces; and
- a materials collection unit removably secured to said vacuum head outer housing unit, said materials collection unit configured to collect debris and other material retrieved from a vacuumed surface.

\* \* \* \* \*